United States Patent
Kulkarni et al.

(10) Patent No.: US 11,220,207 B2
(45) Date of Patent: Jan. 11, 2022

(54) SYSTEM AND METHOD FOR ADAPTIVE DRIVING BEAM HEADLAMP

(71) Applicant: Grote Industries, LLC, Madison, IN (US)

(72) Inventors: Suyash Kulkarni, Madison, IN (US); Sankalp Pampattiwar, Madison, IN (US); Brian Norris, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 0 days.

(21) Appl. No.: 16/822,377

(22) Filed: Mar. 18, 2020

(65) Prior Publication Data
US 2021/0291720 A1    Sep. 23, 2021

(51) Int. Cl.
*B60Q 1/24*    (2006.01)
*B60Q 1/14*    (2006.01)
*B60Q 1/00*    (2006.01)

(52) U.S. Cl.
CPC .......... *B60Q 1/143* (2013.01); *B60Q 1/0023* (2013.01); *B60Q 1/24* (2013.01); *B60Q 2300/42* (2013.01); *B60Q 2300/45* (2013.01)

(58) Field of Classification Search
CPC ........ B60Q 1/143; B60Q 1/0023; B60Q 1/24; B60Q 2300/42; B60Q 2300/45
See application file for complete search history.

(56) References Cited

U.S. PATENT DOCUMENTS

| | | | |
|---|---|---|---|
| 2002/0039294 A1* | 4/2002 | Okuchi | B60Q 1/1423 362/464 |
| 2008/0117642 A1* | 5/2008 | Moizard | B60Q 1/085 362/466 |
| 2018/0038568 A1* | 2/2018 | Sawada | B60Q 1/085 |
| 2019/0315271 A1* | 10/2019 | Tatara | G05D 1/0276 |
| 2020/0282897 A1* | 9/2020 | Muramatsu | B60Q 1/0023 |

* cited by examiner

*Primary Examiner* — Henry Luong
(74) *Attorney, Agent, or Firm* — Posz Law Group, PLC

(57) ABSTRACT

A lighting system, including: a first headlamp on a front of a local vehicle and including a first low-beam lamp for shining light in front of the local vehicle at a first angle below horizontal, a first middle-beam lamp for selectively shining light in front of the local vehicle at a second angle below horizontal, and a first high-beam lamp for selectively shining light in front of the local vehicle at a third angle below horizontal; a sensory cluster for detecting a remote vehicle in front of the first headlamp; a controller for controlling operation of the first low-beam, middle-beam, and high-beam lamps, wherein the first angle is greater than the second angle and the second angle is greater than the third angle, and the controller controls operation of the first middle-beam and high-beam lamps based at least in part on signals from the sensory cluster.

21 Claims, 7 Drawing Sheets

SYSTEM AND METHOD FOR ADAPTIVE DRIVING BEAM HEADLAMP

FIELD OF THE INVENTION

This disclosure relates to an adaptive driving beam (ADB) headlamp for use in a vehicle and a related method of use. More specifically, it relates to a lighting system and method using a headlamp that can automatically switch between a low beam, a middle beam, and a high beam.

BACKGROUND OF THE INVENTION

Adaptive driving beam (ADB) systems use sensors and cameras to gather information about the area around a vehicle and adapt the parameters of the vehicle's lights based on this gathered information. In this way the quality of lighting can be improved without negatively effects on those around the vehicle.

ADB systems provide an important safety function in the forward lighting system of a vehicle. Such systems are often designed to shine light in two different patterns: a high beam pattern that provides greater illumination in front of the vehicle, and a low-beam pattern that provides lesser illumination in front of the vehicle. The greater illumination of the high beam pattern offers a greater illuminated field of view at night for a driver but can be bright enough to interfere with other vehicles that are nearby. The lesser illumination of the low-beam pattern lessens the illuminated field of view for the driver but minimizes the dazzling effect of the lighting to nearby vehicles.

Typical ADB systems have a primary goal of keeping a forward lighting system in a high-beam pattern until an object like an oncoming vehicle is detected at which point the lighting system switches to a low-beam pattern to avoid dazzling of the driver of the oncoming vehicle. This can also occur when the vehicle is getting passed by another vehicle or there is another vehicle already present ahead of the vehicle. Some ADB systems also consider nearby pedestrians when controlling the pattern of the lighting system.

Conventional ADB systems operate by immediately switching from the high-beam pattern to the low-beam pattern when a nearby vehicle is detected and switching back from the low-beam pattern to the high-beam pattern when the other vehicle is no longer nearby.

However, this instant switching between the high-beam pattern and the low-beam pattern can be confusing to the driver who has their illuminated field of view change dramatically in an instant.

It would therefore be desirable to provide a system and method by which the beam pattern of a lighting system could be gradually changed between a high-beam pattern and a low-beam pattern and vice versa so that a dramatic change in a driver's illuminated field of view does not occur.

SUMMARY OF THE INVENTION

A lighting system is provided for a local vehicle, comprising: a first headlamp arranged on a front portion of the local vehicle and including a first low-beam lamp configured to shine light in front of the local vehicle at a first angle below horizontal, a first middle-beam lamp configured to selectively shine light in front of the local vehicle at a second angle below horizontal, and a first high-beam lamp configured to selectively shine light in front of the local vehicle at a third angle below horizontal; a sensory cluster configured to detect a remote vehicle in front of the first headlamp; and a controller configured to control operation of the first low-beam lamp, the first middle-beam lamp, and the first high-beam lamp, wherein the first angle is greater than the second angle and the second angle is greater than the third angle, and the controller is configured to control operation of the first middle-beam lamp, and the first high-beam lamp based at least in part on signals from the sensory cluster.

The controller may be a one of a microcomputer, a microprocessor, or a microcontroller. The sensory cluster may include one of a camera, a radar sensor, a lidar sensor, a sonar sensor, or a light detector.

The sensory cluster may be further configured to determine whether the remote vehicle is within a first distance from the local vehicle, the sensory cluster may be further configured to determine whether the remote vehicle is within a second distance from the local vehicle, and the second distance may be smaller than the first distance.

The lighting system may further comprise a first side lamp arranged on a first side portion of the vehicle and configured to selectively shine light from the first side of the local vehicle; and a second side lamp arranged on a second side portion of the vehicle different from the first side portion and configured to selectively shine light from the second side of the local vehicle.

The headlamp may further comprise a search lamp configured to selectively shine light in front of the local vehicle at a fourth angle below horizontal, and the third angle may be greater than the fourth angle.

The headlamp may be further configured such that the search lamp cannot be activated when the local vehicle is moving.

The lighting system may further comprise a second headlamp arranged on the front portion of the vehicle and including a second low-beam lamp configured to selectively shine light in front of the vehicle at the first angle below horizontal, a second middle-beam lamp to selectively shine light in front of the vehicle at the second angle below horizontal, and a second high-beam lamp to selectively shine light in front of the vehicle at the third angle below horizontal, wherein the controller is further configured to control operation of the second low-beam lamp, the second middle-beam lamp, and the second high-beam lamp, the controller is configured to control operation of the second middle-beam lamp, and the second high-beam lamp based at least in part on signals from the sensory cluster, and the sensory cluster is further configured to detect the remote vehicle in front of the second headlamp.

The first headlamp may further include a third middle-beam lamp configured to selectively shine light in front of the local vehicle at a fourth angle below horizontal, the sensory cluster may be further configured to determine whether the remote vehicle is within a fourth distance from the local vehicle, the controller may be further configured to control operation of the third middle-beam lamp based at least in part on the signals from the sensory cluster, the fourth angle may be between the first angle and the second angle, and the fourth distance may be between the first distance and the second distance.

The first low-beam lamp may be further configured to shine light in a plurality of zones front of the local vehicle at the first angle below horizontal, the first middle-beam lamp may be further configured to selectively and separately shine light in the plurality of zones in front of the local vehicle at the second angle below horizontal, the first high-beam lamp may be further configured to selectively and separately shine light in the plurality of zones in front of the local vehicle at the third angle below horizontal, the controller may be further configured to control operation of the first middle-beam lamp and the first high-beam lamp separately for each of the plurality of zones, and the sensory cluster may be further configured to detect which zone or zones the remote vehicle is in when the remote vehicle is detected in front of the first headlamp.

A method of operating a lighting system for a local vehicle is provided, comprising: turning on a first low-beam lamp to shine light in front of the vehicle at a first angle below horizontal; determining that a remote vehicle is within a first distance from the local vehicle; determining that the remote vehicle is not within a second distance from the local vehicle; turning on a first middle-beam lamp to shine light in front of the local vehicle at a second angle below horizontal after determining that the remote vehicle is not within the second distance from the local vehicle; and turning off a first high-beam lamp configured to selectively shine light in front of the vehicle at a third angle below horizontal after determining that the remote vehicle is not within the second distance from the local vehicle, wherein the first angle is greater than the second angle and the second angle is greater than the third angle, and the second distance is lower than the first distance.

The operation of turning off the high-beam lamp can be performed by physically turning off the first high-beam lamp or observing that the high-beam lamp is already off and not manipulating the first high-beam lamp.

The method may further comprise: determining that the remote vehicle is no longer within the first set distance from the local vehicle and that no other vehicle is within the first set distance from the local vehicle after turning on the first middle-beam lamp and turning off the first high-beam lamp; turning on the first high-beam lamp to shine light in front of the vehicle at the third angle below horizontal, and turning off the first middle-beam lamp.

The method may further comprise: determining that the remote vehicle is within the second set distance from the local vehicle after turning on the first middle-beam lamp and turning off the first high-beam lamp; and turning off the first high-beam lamp and the first middle-beam lamp after determining that the remote vehicle is within the second distance from the local vehicle.

The method may further comprise: determining that the local vehicle is turning;
determining a direction that the local vehicle is turning; turning on a first side-beam lamp corresponding to the direction that the local vehicle is turning; and turning off a second side-beam lamp not corresponding to the direction that the local vehicle is turning.

The method may further comprise: determining that the remote vehicle is within the second distance from the local vehicle but is not within a fourth distance from the local vehicle after turning on the first middle-beam lamp and turning off the first high-beam lamp; turning on a second middle-beam lamp to shine light in front of the local vehicle at a fourth angle below horizontal after determining that the remote vehicle is within the second distance from the local vehicle but is not within the fourth distance from the local vehicle; and turning off the first middle-beam lamp after determining that the remote vehicle is within the second distance from the local vehicle but is not within the fourth distance from the local vehicle, wherein the fourth angle may be between the first angle and the second angle, and the fourth distance may be between the first distance and the second distance.

The operation of turning off the side-beam lamp can be performed by physically turning off the second side-beam lamp or observing that the second side-beam lamp is already off and not manipulating the second side-beam lamp.

A method of operating a lighting system for a local vehicle is provided, comprising: turning on a first low-beam lamp to shine light in a plurality of zones in front of the vehicle at a first angle below horizontal; determining that a remote vehicle is within a first distance in front of the local vehicle; determining that the remote vehicle is not within a second distance in front of the local vehicle; determining a first detected zone or zones in front of the local vehicle in which the remote vehicle is located; determining a second detected zone or zones in front of the local vehicle in which the remote vehicle is not located; turning on a first portion of a first middle-beam lamp to shine light in the first detected zone or zones at a second angle below horizontal after determining that the remote vehicle is not within the second distance from the local vehicle; turning off a second portion of a first middle-beam lamp configured to selectively shine light in the second detected zone or zones at the second angle below horizontal after determining that the remote vehicle is not within the second distance from the local vehicle; turning off a first portion of a first high-beam lamp configured to selectively shine light in the first detected zone or zones at a third angle below horizontal after determining that the remote vehicle is not within the second distance from the local vehicle; and turning on a first portion of a first high-beam lamp to shine light in the second detected zone or zones at the third angle below horizontal after determining that the remote vehicle is not within the second distance from the local vehicle, wherein the first angle is greater than the second angle and the second angle is greater than the third angle, and the second distance is lower than the first distance.

The method may further comprise: determining that the remote vehicle is no longer within the first set distance from the local vehicle and that no other vehicle is within the first set distance from the local vehicle after turning on the first middle-beam lamp and turning off the first high-beam lamp; turning on the first and second portions of the first high-beam lamp to shine light in the plurality of zones in front of the vehicle at the third angle below horizontal, and turning off the first and second portions of the first middle-beam lamp.

The method may further comprise: determining that the remote vehicle is within the second set distance from the local vehicle after turning on the first middle-beam lamp and turning off the first high-beam lamp; and turning off the first portion of the first middle-beam lamp after determining that the remote vehicle is within the second distance from the local vehicle.

The method may further comprise: determining that the remote vehicle is within the second distance from the local vehicle but is not within a fourth distance from the local vehicle after turning on the first portion of the first middle-beam lamp and turning off the first portion of the first high-beam lamp; turning on a first portion of a second middle-beam lamp to shine light in the first detected zone or zones at a fourth angle below horizontal after determining that the remote vehicle is within the second distance from the local vehicle but is not within the fourth distance from the local vehicle; turning off a second portion of a second middle-beam lamp configured to selectively shine light in the second detected zone or zones at the fourth angle below horizontal after determining that the remote vehicle is within the second distance from the local vehicle but is not within the fourth distance from the local vehicle; and turning off the first portion of the first middle-beam lamp after determining that the remote vehicle is within the second distance from the local vehicle but is not within the fourth distance from the local vehicle, wherein the fourth angle may be between the first angle and the second angle, and the fourth distance may be between the first distance and the second distance.

A system for operating a lighting system of a local vehicle is provided, comprising: a memory; and a processor cooperatively operable with the memory, and configured to, based on instructions stored in the memory, turn on a first low-beam lamp to shine light in front of the vehicle at a first angle below horizontal, determine that a remote vehicle is within a first distance from the local vehicle, determine that the remote vehicle is not within a second distance from the local vehicle, turn on a first middle-beam lamp to shine light in front of the local vehicle at a second angle below horizontal after determining that the remote vehicle is not within the second distance from the local vehicle, and turn off a first high-beam lamp configured to selectively shine light in front of the vehicle at a third angle below horizontal after determining that the remote vehicle is not within the second distance from the local vehicle, wherein the first angle is greater than the second angle and the second angle is greater than the third angle, and the second distance is lower than the first distance.

The processor may determine that the remote vehicle is within the first distance from the local vehicle and determines that the remote vehicle is not within the second distance from the local vehicle at least in part using information received from a sensory cluster on the local vehicle.

The processor may be further configured to, based on instructions stored in the memory: determine that the remote vehicle is no longer within the first distance from the local vehicle and that no other vehicle is within the first distance from the local vehicle after turning on the middle-beam lamp and turning off the high-beam lamp; turn on the first high-beam lamp to shine light in front of the vehicle at the third angle below horizontal, and turn off the first middle-beam lamp.

The processor may be further configured to, based on instructions stored in the memory: determine that the remote vehicle is within the second distance from the local vehicle after turning on the first middle-beam lamp and turning off the first high-beam lamp; and turn off the first high-beam lamp and the first middle-beam lamp after determining that the remote vehicle is within the second distance from the local vehicle.

The processor may be further configured to, based on instructions stored in the memory: determine that the local vehicle is turning; determine a direction that the local vehicle is turning; turn on a first side-beam lamp corresponding to the direction that the local vehicle is turning; and turn off a second side-beam lamp not corresponding to the direction that the local vehicle is turning.

The processor may be further configured to, based on instructions stored in the memory: determine that the remote vehicle is within the second distance from the local vehicle but is not within a fourth distance from the local vehicle after turning on the first middle-beam lamp and turning off the first high-beam lamp; turn on a second middle-beam lamp to shine light in front of the local vehicle at a fourth angle below horizontal after determining that the remote vehicle is within the second distance from the local vehicle but is not within the fourth distance from the local vehicle; and turn off the first middle-beam lamp after determining that the remote vehicle is within the second distance from the local vehicle but is not within the fourth distance from the local vehicle, wherein the fourth angle may be between the first angle and the second angle, and the fourth distance may be between the first distance and the second distance.

DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
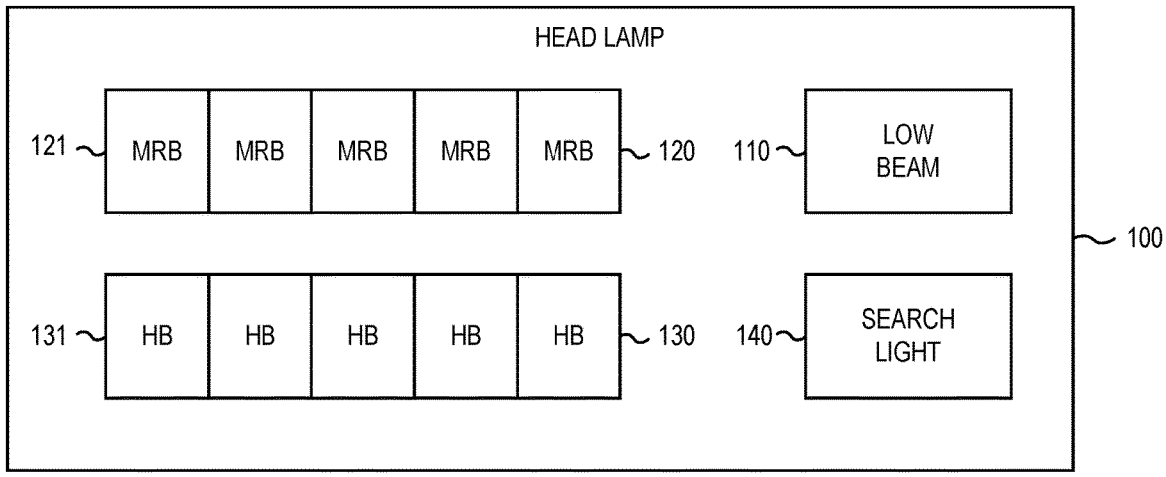
FIG. 1 is a block diagram of a vehicle headlamp according to disclosed embodiments.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Vehicle Lighting System with Headlamp

Adaptive driving beam (ADB) systems typically depend on the principle of either dynamic switching or use a matrix-type structure. Dynamic switching uses a mechanical means to switch a headlamp between a high-beam pattern and a low-beam pattern to avoid the dazzling effect on the drivers of the oncoming vehicle. A matrix-type structure relies on the placement of light-emitting diodes (LEDs) in a particular manner which can be turned ON/OFF to switch between the high-beam pattern and the low-beam pattern based on input sensor signals and decisions made by a control system.

Typically, ADB systems will have a low-beam light and a high-beam light. The low-beam light always emits light in a low-beam pattern that satisfies legal requirements for vehicular lights when the vehicular lights are on. The high-beam light emits light in a high-beam pattern that is emitted in addition to the low-beam light to generate a combined illumination that is considered high-beam illumination.

A lighting system can also be provided that has one or more middle-beam lights in addition to the low-beam light and the high-beam light. The one or more middle beam-lights emit light in one or more corresponding middle-beam patterns. This allows the lighting system to gradually switch from the high-beam pattern to the low-beam pattern by stepping through the one or more middle-beam patterns. Thus, instead of the high-beam light being immediately shifted from an ON position to an OFF position, the beam pattern can change less abruptly. At any given time, the pattern of the light emitted by a headlamp is manipulated in terms of its angular focus on an area in front of the vehicle.

Although one way of accomplishing this is using a matrix-type structure with separate lights in the matrix that form the low-beam light, the high-beam light, and the one or more middle-beam lights, the concepts are equally applicable to dynamic ADB systems. Such a dynamic system would have one or more separate middle-beam lights that provided one or more middle-beam patterns, respectively, in addition to a high-beam light that provides a high-beam pattern and low-beam light that provides a low-beam pattern.

Furthermore, although the use of LEDs as a light source is one possible embodiment, this is by way of example only. Alternate embodiments can use other types of light sources, such as incandescent, laser, etc.

FIG. 1 is a block diagram of a vehicle headlamp 100 according to disclosed embodiments. As shown in FIG. 1, the vehicle headlamp 100 includes a low-beam (LB) light 110, a middle-range-beam (MRB) light 120, a high-beam (HB) light 130, and a search light 140. The MRB light 120 includes a plurality of individual MRB lights 121 arranged in a first array, and the HB light 130 includes a plurality of individual HB lights 131 arranged in a second array.

The low-beam (LB) light 110 is a light configured to emit light in a low-beam pattern that satisfies the legal requirements regarding light area and luminescence for a local vehicle (not shown) in which the headlamp 100 is located. For example, this LB light 110 may be restricted to a certain luminosity, it may be restricted to a certain angle from horizontal, it may be required to be asymmetric, etc. Requirements may vary in different jurisdictions and for different kinds of vehicles.

The headlamp 100 will generally be configured such that the LB light 110 is always on whenever the headlamp 100 is activated to provide a guaranteed minimum amount of light whenever a vehicle operator requires the headlamp 100 to be on.

The middle-range-beam (MRB) light 120 is a light or a matrix of lights configured to emit light in a middle-beam pattern that provides greater illumination in front of the local vehicle compared to the low-beam pattern. This could be achieved by having the MRB light 120 emit light of a greater intensity than the LB light 110, by having the MRB light 120 emit light of a smaller angle from horizontal than the LB light 110, by having the MRB light 120 shine symmetrical light, or some combination of settings.

The MRB pattern is designed such that it works in conjunction with the LB pattern to provide MRB illumination in front of the local vehicle. Thus, in normal operation in a moving vehicle, the MRB light 120 should never be activated at a time when the LB light 110 is not also activated.

In the embodiment of FIG. 1, the MRB light 120 includes an array of a plurality of individual MRB lights 121 that each shine light having a middle-beam pattern into one of a plurality of corresponding MRB zones in front of the vehicle. These MRB zones cover a field of view in front of the vehicle and may be overlapping or non-overlapping. They may be of equal size or of a different size.

For example, the embodiment of FIG. 1 shows a MRB light 120 having five individual MRB lights 121 that shine in five separate MRB zones, respectively, in front of the local vehicle. In the disclosed embodiment the individual MRB lights 121 are made up of LEDs, though this is by way of example only. Alternate embodiments can use any suitable lighting element for the individual MRB lights 121. Furthermore, the MLB light 120 could include more or fewer individual MRB lights 121 with the number of MRB zones adjusted accordingly. It could even contain only a single individual MRB light 121 that covered the entire field of view in front of the local vehicle.

The high-beam (HB) light 130 is a light or a matrix of lights configured to emit light in a high-beam pattern that provides greater illumination in front of the local vehicle compared to the low-beam pattern and the middle-beam pattern and to satisfying legal requirements for a high beam, such as are set forth in the Society for Automotive Engineers (SAE) regulation J1983. This could be achieved by having the HB light 130 emit light of a greater intensity than both the LB light 110 and the MRB light 120, by having the HB light 130 emit light of a smaller angle from horizontal than both the LB light 110 and the MRB light 120, by having the HB light 130 shine symmetrical light, or some combination of settings.

The HB pattern is designed such that it works in conjunction with the LB pattern to provide HB illumination in front of the local vehicle. Thus, in normal operation in a moving vehicle, the HB light 130 should never be activated at a time when the LB light 110 is not also activated.

In the embodiment of FIG. 1, the HB light 130 includes an array of a plurality of individual HB lights 131 that each shine light having a high-beam pattern into one of a plurality of corresponding HB zones in front of the vehicle. These HB zones cover a field of view in front of the vehicle and may be overlapping or non-overlapping. They may be of equal size or of a different size. They may be the same as the MRB zones used for the individual MRB lights 121 or may be different zones, though control will be simpler if the MRB light 120 and the HB light 130 use the same zones.

For example, the embodiment of FIG. 1 shows a HB light 130 having five individual HB lights 131 that shine in five separate HB zones, respectively, in front of the local vehicle. The number of individual HB lights 131 and the number of HB zones is the same as the number of MRB lights 121 and MRB zones, though this is by way of example only.

In the disclosed embodiment, the individual HB lights 131 are made up of LEDs, though this is by way of example only. Alternate embodiments can use any suitable lighting element for the individual HB lights 131. Furthermore, the HB light 120 could include more or fewer individual HB lights 131 with the number of zones adjusted accordingly. It could even contain only a single individual HB light 131 that covered the entire field of view in front of the local vehicle.

The search light 140 is a light or a matrix of lights configured to emit light in a search-light-beam pattern that provides greater illumination in front of the local vehicle compared to the low-beam pattern, the middle-beam pattern, and the high-beam pattern. This could be achieved by having the search light 140 emit light of a greater intensity than all of the LB light 110, the MRB light 120, and the HB light 130, by having the search light 140 emit light of a smaller angle from horizontal than all of the LB light 110, the MRB light 120, and the HB light 130, by having the search light 140 shine symmetrical light, or some combination of settings.

The intensity and range of the light emitted by the search light 140 may be set to be greater than would be appropriate for a moving vehicle. This is because the search light 140 is intended to be used when the vehicle is at rest. In various embodiments the search light 140 could be activated independently of one or more of the LB light 110, the MRB light 120, and the HB light 130, or in conjunction with one or more of these lights.

By having a LB light 110, an MRB light 120, and an HB light 130, the headlamp 100 can provide for a stepwise shift between light in a LB pattern from the LB light 110 and light in an HB pattern from the LB light 110 and the HB light 130. In particular, the headlamp 100 can step down from light in the HB pattern to light in the MRB pattern from the LB light 110 and the MRB light 120, reducing the glare caused by the light from the headlamp 100, but not dropping the light pattern immediately and dramatically down to the LB pattern.

The headlamp 100 can then maintain its light in the MRB pattern for a time before stepping down from the MRB pattern to the LB pattern. In this way, the shift from light in the HB pattern to light in the LB pattern will not be dramatic and will be less distracting to the operator of the local vehicle.

Furthermore, this will allow for greater illumination in front of the local vehicle by allowing the headlamp 100 to project light in the MRB pattern when light in the HB pattern would be too dazzling to the driver of a remote vehicle, but light in the MRB pattern would not be too dazzling.

Figure 2:
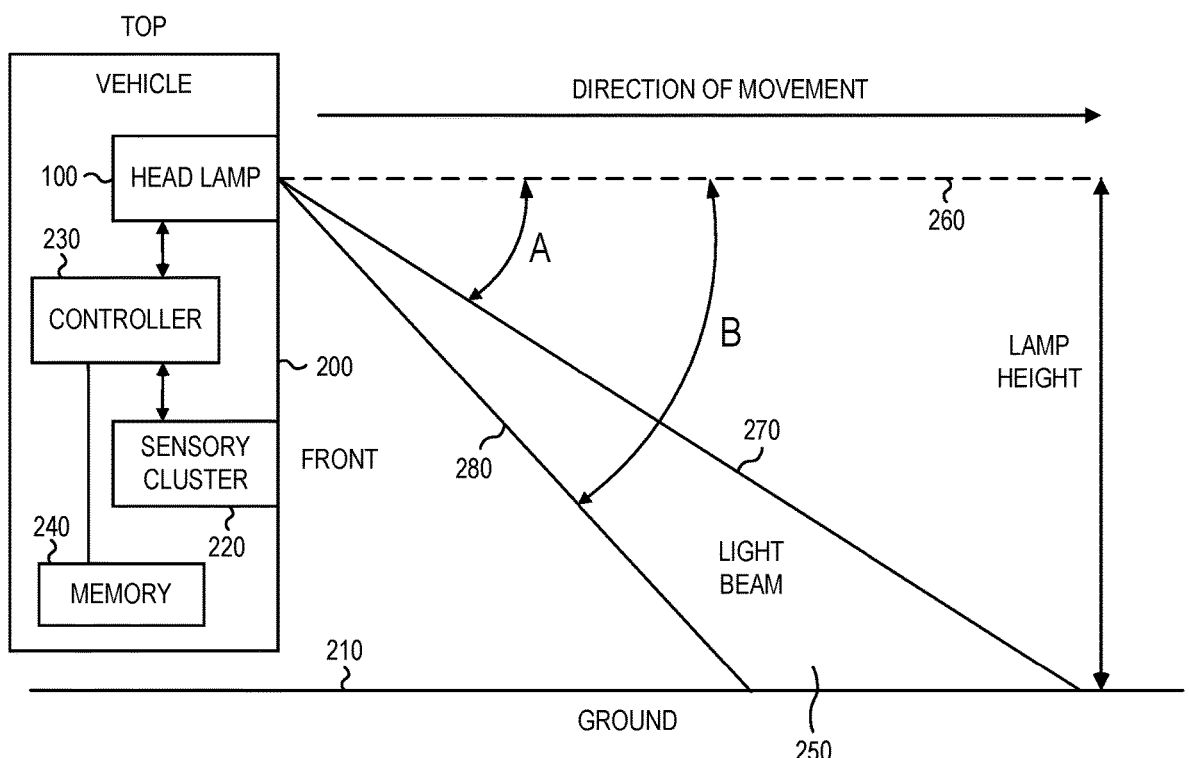
FIG. 2 is a diagram of a side view of the projection of light from the headlamp of FIG. 1 in front of a vehicle according to disclosed embodiments.

FIG. 2 is a diagram of a side view of the projection of light from the headlamp 100 of FIG. 1 in front of a vehicle according to disclosed embodiments.

As shown in FIG. 2, a local vehicle 200 is provided for travelling over a portion of ground 210. The local vehicle 200 includes a headlamp 100, a sensory cluster 220, a controller 230, and a memory 240. The headlamp 100 shines a light beam 250 over an area below a horizontal line 260 extending from the headlamp 100 defined by an upper boundary 270 and a lower boundary 280.

The local vehicle 200 in this embodiment could be a car, a truck, motorcycle, or any desired wheeled vehicle. Alternate embodiments could potentially be employed in air or water vehicles.

The headlamp 100 corresponds to the headlamp 100 from FIG. 1 and operates as described above with respect to FIG. 1. The headlamp 100 is located at a lamp height above the ground 210. The headlamp 100 receives commands from and may provide information to the controller 230.

The sensory cluster 220 is configured to detect a remote vehicle (not shown) proximate to the local vehicle. The area of detection of the sensory cluster 220 is preferably at least as large as the field of view in front of the local vehicle. In other words, the sensory cluster 220 will preferably be able to detect a remote vehicle anywhere in the field of view in front of the local vehicle. As a result, the sensory cluster 220 should be able to detect any vehicle that will receive light from any portion of the headlamp 100.

In various embodiments, the sensory cluster 220 may include one or more of a camera, a radar sensor, a lidar sensor, a sonar sensor, or a light detector. However, in alternate embodiments any sensor that can detect an approaching remote vehicle can be used in the sensory cluster 220. The various sensors in the sensory cluster 220 can preferably detect at least the presence of a remote vehicle proximate to the local vehicle, a distance of the remote vehicle to the local vehicle, and a relative speed between the remote vehicle and the local vehicle. In some embodiments the sensory cluster 220 may only include a single type of sensor. In other embodiments, multiple types of sensors can be employed. The sensory cluster 220 sends sensory data to the controller 230. This sensory data can include the presence of a remote vehicle proximate to the local vehicle, a distance of the remote vehicle to the local vehicle, and a relative speed between the remote vehicle and the local vehicle.

The controller 230 is configured to control the operation of the headlamp 100 and the sensory cluster 220. The controller 230 is also configured to store and read data from the memory 240. The controller 230 will receive sensory data from the sensory cluster 220 and may receive information from the headlamp 100. The controller 230 will provide instructions to the headlamp 100 and the sensory cluster 220 regarding how these two circuits should be operated.

The controller 230 acts upon the sensory data received from the sensory cluster 220. When this sensory data indicates that an oncoming or a passing remote vehicle is detected, then the controller 230 provides the control action necessary to adjust the operation of the headlamp 100 based on at least one of the presence of a remote vehicle proximate to the local vehicle, a distance of the remote vehicle to the local vehicle, a relative speed between the remote vehicle and the local vehicle, or any other sensory data provided by the sensory cluster 220. This control action depends on whether the operating principle of the headlamp 100 is a matrix-type light or a dynamic-type light. Regardless, the controller 230 can operate to control the headlamp 100 such that the light it produces will not dazzle the operator of the detected remote vehicle and will comply with all pertinent regulations.

In various embodiments, the controller 230 can be a microcomputer, a microprocessor, a microcontroller, a CPU, an ASIC, etc. It may also have an integrated memory in addition to or in place of the memory 240.

The memory 240. Includes one or both of a static or dynamic memory and is configured to store data and programming used by the controller 230. In various embodiments, the memory can be SRAM, DRAM, PROM, EPROM, EEPROM, flash memory, or any suitable memory element. The memory 240 is not required in every embodiment.

The light beam 250 represents a combination of search light, HB light, MRB light, and LB light as defined by the upper boundary 270 and the lower boundary 280. The intensity of the light in the light beam 250 may vary depending upon which beam patterns are currently active. For example, the light beam 250 may have a higher intensity when the HB light and the LB light are on as compared to when only the LB light is on.

The upper boundary 270 represents an upper elevation of the light beam 250 and is defined by an angle A below the horizontal line 260 extending from the headlamp 100. Similarly, the lower boundary 280 represents a lower elevation of the light beam 250 and is defined by an angle B below the horizontal line 260 extending from the headlamp 100. The angle B will be greater than the angle A so that the light beam 250 has a maximum angular width of (B-A).

Figure 3:
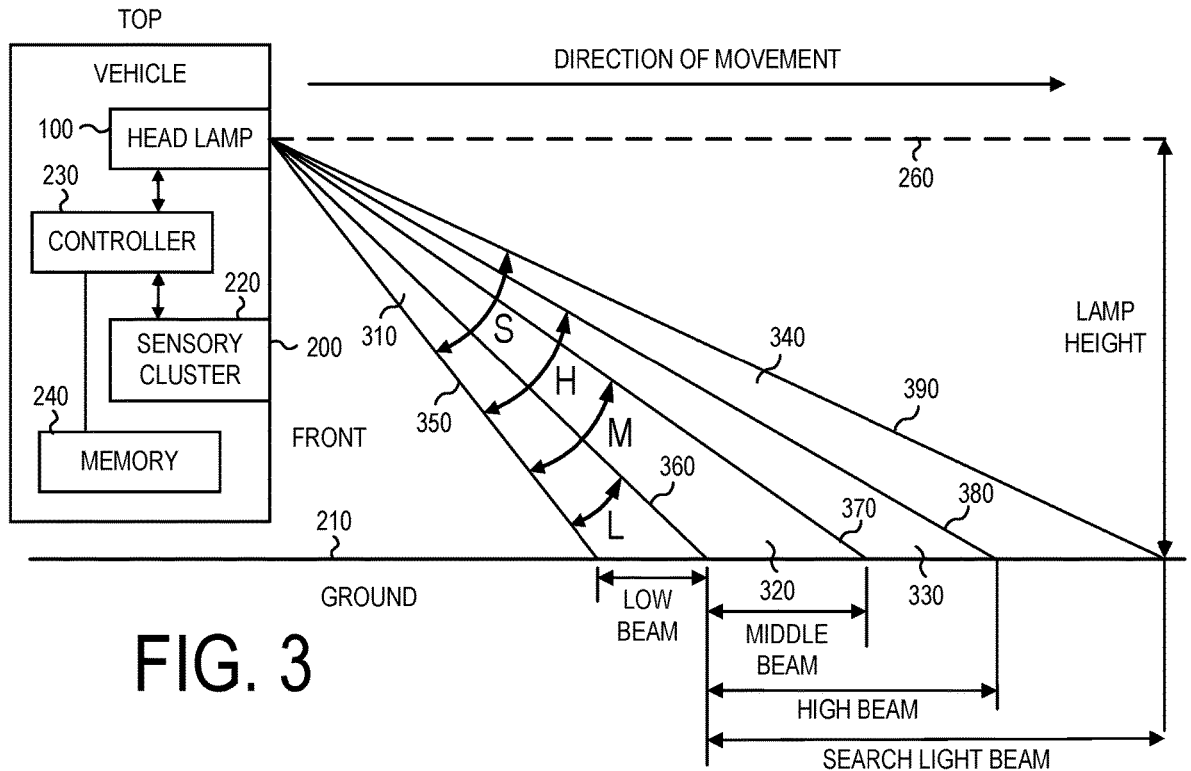
FIG. 3 is a more detailed diagram of a side view of the projection of light from the headlamp of FIG. 1 in front of a vehicle according to disclosed embodiments.

FIG. 3 is a more detailed diagram of a side view of the projection of light from the headlamp 100 of FIG. 1 in front of a vehicle according to disclosed embodiments.

As shown in FIG. 3, a local vehicle 200 is provided for travelling over a portion of ground 210. The local vehicle 200 includes a headlamp 100, a sensory cluster 220, a controller 230, and a memory 240. The headlamp 100 shines a light beam 250 over an area below a horizontal line 260 extending from the headlamp 100.

The local vehicle 200, the headlamp 100, the sensory cluster 220, the controller 230, the memory 240, and the light beam 250 operate as described above with respect to FIG. 2.

The light beam 250 in this embodiment includes a first beam 310, a second beam 320, a third beam 330, and a fourth beam 340. The first beam 310 is defined by a first light boundary 350 and a second light boundary 360; the second beam 320 is defined by the second light boundary 360 and a third light boundary 370; the third beam 330 is defined by the third light boundary 370 and a fourth light boundary 380; and the fourth beam 340 is defined by the fourth light boundary 380 and a fifth light boundary 390.

A low beam of light output from the headlamp 100 is formed by the first beam 310. A middle beam of light output from the headlamp 100 is formed by a combination of the first beam 310 and the second beam 320. A high beam of light output from the headlamp 100 is formed by a combination of the first beam 310, the second beam 320, and the third beam 330. A search light beam is formed by a combination of the first beam 310, the second beam 320, the third beam 330, and the fourth beam 340.

With reference to the headlamp 100 of FIG. 1, the LB light 110 outputs the first beam 310; the MRB light 120 outputs the second beam 320; the HB light 130 outputs the second beam 320 and the third beam 330; and the search light 140 outputs the second beam 320, the third beam 330, and the fourth beam 340. In this way when the LB light 110 is on and the MRB light 120, the HB light 130, and the search light 140 are all off, the headlamp 100 outputs the low beam. Likewise, when the LB light 110 and the MRB light 120 are on and the HB light 130 and the search light 140 are both off, the headlamp 100 outputs the middle beam. Similarly, when the LB light 110 and the HB light 130 are both on and the MRB light 120 and the search light 140 are both off, the headlamp 100 outputs the high beam. Finally, when the LB light 110 and the search light 140 are both on and the MRB light 120 and the HB light 130 are both off, the headlamp 100 outputs the search light beam.

Although the disclosed embodiment shows that the HB light 130 outputs both the second beam 320 and the third beam 330, alternate embodiments could have the HB light 130 only output the third beam 330. In such an embodiment, the headlamp 100 would output the high beam when the LB light 110, the MRB light 120, and the HB light 130 were all on and the search light 140 was off. Similarly, although the disclosed embodiment shows that the search light 140 outputs the second beam 320, the third beam 330, and the fourth beam 340, alternate embodiments could have the search light 140 only output the fourth beam 340. In such an embodiment, the headlamp 100 would output the search light beam when the LB light 110, the MRB light 120, the HB light 130, and the search light 140 were all on. Other permutations of lights are possible.

As shown in FIG. 3, the first light boundary 350 is at a first declination from the horizontal line 260 that is greater than the second, third, fourth, and fifth light boundaries 360, 370, 380, 390; the second light boundary 360 is at a second declination from the horizontal line 260 that is smaller than the first declination of the first light boundary 350; the third light boundary 370 is at a third declination from the horizontal line 260 that is smaller than the second declination of the second light boundary 360; the fourth light boundary 380 is at fourth declination from the horizontal line 260 that is smaller than the third declination of the third light boundary 370; and the fifth light boundary 390 is at a fifth declination from the horizontal line 260 that is smaller than the fourth declination of the fourth light boundary 380.

In addition to differing declinations, the first beam 310, the second beam 320, the third beam 330, and the fourth beam 340 can have different light intensities and even different shapes. For example, the first beam 310 could have an intensity that is lower than the second beam 320; the second beam 320 could have an intensity that is lower than the third beam 330; and the third beam 330 could have an intensity that is lower than the fourth beam 340. In this way the search light beam could have the greatest intensity, the high beam could have the second greatest intensity, the middle beam could have the third greatest intensity, and the low beam could have the lowest intensity.

Likewise, the first beam 310 could have an asymmetrical shape to meet SAE requirements for a low beam, while the second and third beams 320, 330 could have a symmetrical shape that covered the entire field of view in front of the local vehicle, and the fourth beam could have a symmetrical shape that covered an area greater than the entire field of view in front of the local vehicle (i.e., greater than a normal field of view of an operator of the local vehicle). Other permutations are possible in alternate embodiments.

The specific angular limits for the first, second, third, fourth, and fifth light boundaries 350, 360, 370, 380, 390 can depend on the height of the local vehicle and the lamp height of the headlamp 100. A taller vehicle could require steeper declinations for the light boundaries 350, 360, 370, 380, 390 to maintain the legally required light limits for the local vehicle.

Figure 4:
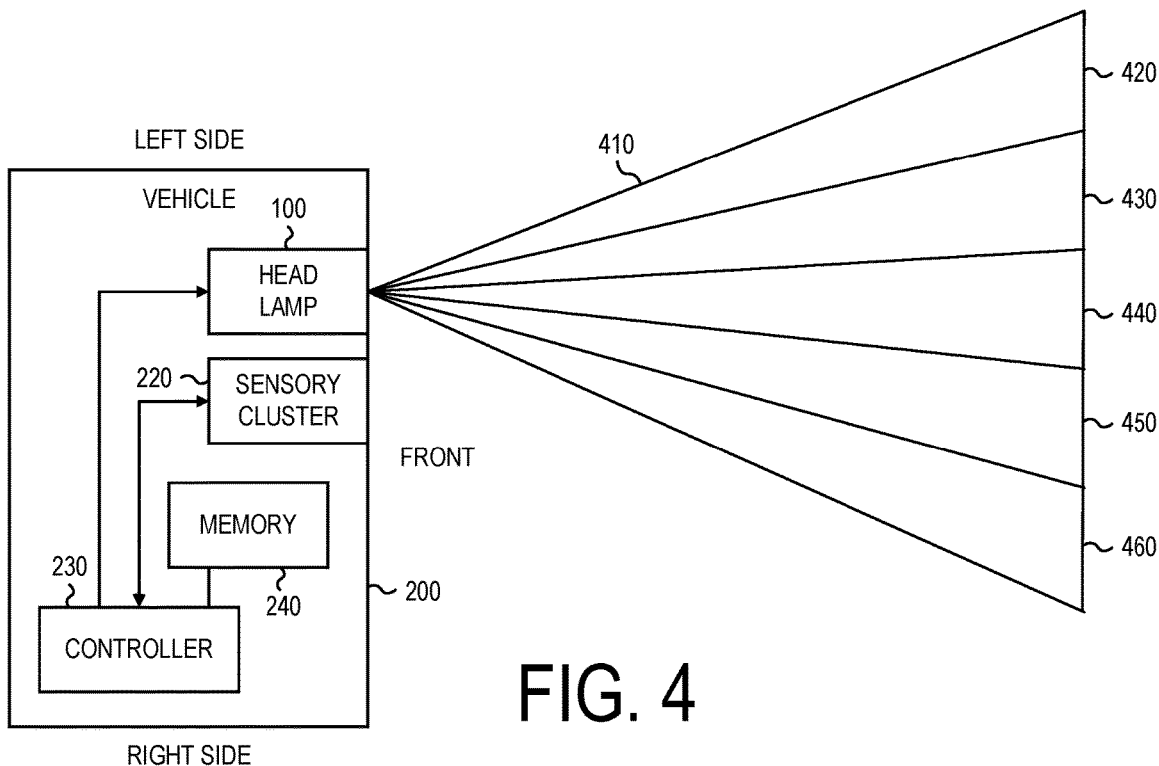
FIG. 4 is a diagram of a top view of the projection of light from the headlamp of FIG. 1 according to disclosed embodiments.

FIG. 4 is a diagram of a top view of the projection of light from the headlamp 100 of FIG. 1 according to disclosed embodiments.

As shown in FIG. 4, a local vehicle 200 is provided for travelling over a portion of ground 210. The local vehicle 200 includes a headlamp 100, a sensory cluster 220, a controller 230, and a memory 240. The headlamp 100 shines light into a field of view 410 in front of the local vehicle 200. This field of view 410 includes a plurality of zones. In the disclosed embodiment, the plurality of zones include a first zone 420, a second zone 430, a third zone 440, a fourth zone 450, and a fifth zone 460.

The local vehicle 200, the headlamp 100, the sensory cluster 220, the controller 230, the memory 240, and the light beam 250 operate as described above with respect to FIG. 2.

The field of view 410 represents an area in front of the local vehicle 200 that the operator can see, and which is illuminated by the headlamp 100. In the embodiment of FIG. 4, the field of view 410 is broken up into five separate zones 420, 430, 440, 450, 460. However, this is by way of example only. Alternate embodiments could use more or fewer zones. Some embodiments could have a single zone that covers the entire field of view 410.

These zones 420, 430, 440, 450, 460 cover the field of view 410 in front of the vehicle and may be overlapping or non-overlapping. They may be of equal size or of a different size. Some embodiments can use the same zones 420, 430, 440, 450, 460 for both the MRB lamp 120 and the HB lamp 130. Alternate embodiments can use different zones for the MRB lamp 120 and the HB lamp 130.

The zones 420, 430, 440, 450, and 460 represent different segments of the field of view 410 in which the light emitted by the headlamp 100 can be separately controlled.

In the embodiment of FIG. 4, a LB light 110 in the headlamp 100 is configured to shine light in a LB pattern in the entire field of view 410. This is because in this embodiment the LB light 110 is always on when the headlamp 100 is activated, regardless of whether a remote vehicle is detected. Therefore, there is no need to provide any greater granularity.

The MRB light 120 is configured to selectively shine light having an MRB pattern into one or more of the first through fifth zones 420, 430, 440, 450, 460 through its individual MRB lights 121 based on control signals received from the controller 230. For example, an individual MRB light 121 in the MRB light 120 could shine light having the MRB pattern into just one of the zones 420, 430, 440, 450, 460, three individual MRB lights 121 in the MRB light 120 could shine light having the MRB pattern into three of the zones 420, 430, 440, 450, 460, or some subset of the MRB light 120 could shine light having the MRB pattern into any desired combination of zones. In this way, the controller 230 can selectively turn on a middle beam in each of the five zones 420, 430, 440, 450, 460. Thus, if a remote vehicle were detected in the third zone 440, the controller 230 could shine a low beam in the third zone 440 and a middle beam in the first, second, fourth, and fifth zones 420, 430, 450, 460, thus increasing the amount of light in the field of view 410 while preventing the operator of the remote vehicle from being dazzled by light from the headlamp 100.

Similarly, the HB light 130 is configured to selectively shine light having an HB pattern into one or more of the first through fifth zones 420, 430, 440, 450, 460 through its individual HB lights 131 based on control signals received from the controller 230. For example, an individual HB light 131 in the HB light 130 could shine light having the HB pattern into just one of the zones 420, 430, 440, 450, 460, four individual HB lights 131 in the HB light 130 could shine light having the HB pattern into four of the zones 420, 430, 440, 450, 460, or a subset of the HB light 130 could shine light having the HB pattern into any desired combination of zones. In this way, the controller 230 can selectively turn on a high beam in each of the five zones 420, 430, 440, 450, 460. Thus, if a remote vehicle were detected in the second zone 430, the controller 230 could shine a low beam in the second zone 430 and a high beam in the first, third, fourth, and fifth zones 420, 440, 450, 460, thus maximizing the amount of light in the field of view 410 while preventing the operator of the remote vehicle from being dazzled by light from the headlamp 100.

The search light 140 is configured to shine light having a search-light pattern in the entire field of view 410. This is because in this embodiment the search light 140 is intended for use when the local vehicle 200 is not moving and there is no danger of dazzling the operator of a remote vehicle. Therefore, there is no need to provide any greater granularity.

The controller 230 is configured to use the sensory data received from the sensory cluster 220 to determine whether a remote vehicle has been detected and in which of the zones 420, 430, 440, 450, 460 the remote vehicle is located.

Alternate Headlamp Design

Figure 5:
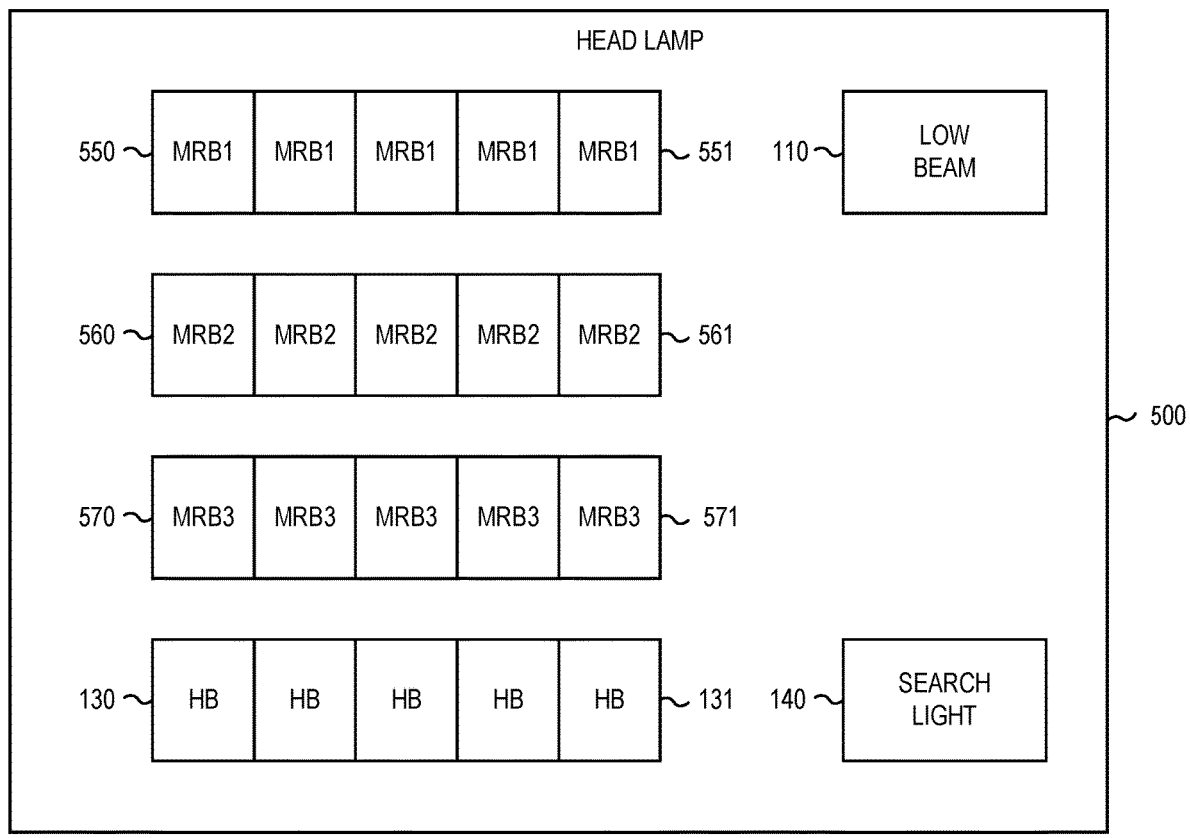
FIG. 5 is a block diagram of a vehicle headlamp according to alternate disclosed embodiments.

FIG. 5 is a block diagram of a vehicle headlamp 500 according to alternate disclosed embodiments. As shown in FIG. 5, the vehicle headlamp 500 includes a low-beam (LB) light 110, a first middle-range-beam (MRB) light 550, a second MRB light 560, a third MRB light 570, a high-beam (HB) light 130, and a search light 140.

The LB light 110 and the search light 140 operate as described above with respect to the comparable element in the vehicle headlamp 100 of FIG. 1.

The first MRB light 550 is a light or a matrix of lights configured to emit light in a first middle-beam pattern that provides greater illumination in front of the local vehicle compared to the low-beam pattern. This could be achieved by having the first MRB light 550 emit light of a greater intensity than the LB light 110, by having the first MRB light 550 emit light of a smaller angle from horizontal than the LB light 110, by having the first MRB light 550 shine symmetrical light, or some combination of settings.

The first MRB pattern is designed such that it works in conjunction with the LB pattern to provide first MRB illumination in front of the local vehicle. Thus, in normal operation in a moving vehicle, the first MRB light 120 should never be activated at a time when the LB light 110 is not also activated.

In the embodiment of FIG. 5, the first MRB light 550 includes an array of a plurality of individual first MRB lights 551 that each shine light having a first middle-beam pattern into one of a plurality of corresponding first MRB zones in front of the local vehicle. These first MRB zones cover a field of view in front of the vehicle and may be overlapping or non-overlapping. They may be of equal size or of a different size.

For example, the embodiment of FIG. 5 shows a first MRB light 550 having five individual first MRB lights 551 that shine in five separate first MRB zones, respectively, in front of the local vehicle. In the disclosed embodiment the individual first MRB lights 551 are made up of LEDs, though this is by way of example only. Alternate embodiments can use any suitable lighting element for the individual first MRB lights 551. Furthermore, the first MRB light 550 could include more or fewer individual first MRB lights 551 with the number of first MRB zones adjusted accordingly. It could even contain only a single individual first MRB light 551 that covered the entire field of view in front of the local vehicle.

The second MRB light 560 is a light or a matrix of lights configured to emit light in a second middle-beam pattern that provides greater illumination in front of the local vehicle compared to the low-beam pattern or the first middle-beam pattern. This could be achieved by having the second MRB light 560 emit light of a greater intensity than both the LB light 110 and the first MRB light 550, by having the second MRB light 560 emit light of a smaller angle from horizontal than the LB light 110 and the first MRB light 550, by having the second MRB light 560 shine symmetrical light, or some combination of settings.

The second MRB pattern is designed such that it works in conjunction with the LB pattern and the first MRB pattern to provide second MRB illumination in front of the local vehicle. Thus, in normal operation in a moving vehicle, the second MRB light 560 should never be activated at a time when the LB light 110 is not also activated.

In the embodiment of FIG. 5, the second MRB light 560 includes an array of a plurality of individual second MRB lights 561 that each shine light having a second middle-beam pattern into one of a plurality of corresponding second MRB zones in front of the local vehicle. These second MRB zones cover a field of view in front of the vehicle and may be overlapping or non-overlapping. They may be of equal size or of a different size.

For example, the embodiment of FIG. 5 shows a second MRB light 560 having five individual second MRB lights 561 that shine in five separate second MRB zones, respectively, in front of the local vehicle. In the disclosed embodiment the individual second MRB lights 561 are made up of LEDs, though this is by way of example only. Alternate embodiments can use any suitable lighting element for the individual second MRB lights 561. Furthermore, the second MLB light 560 could include more or fewer individual second MRB lights 561 with the number of second MRB zones adjusted accordingly. It could even contain only a single individual second MRB light 561 that covered the entire field of view in front of the local vehicle.

The third MRB light 570 is a light or a matrix of lights configured to emit light in a third middle-beam pattern that provides greater illumination in front of the local vehicle compared to the low-beam pattern, the first middle-beam pattern, and the second middle-beam pattern. This could be achieved by having the third MRB light 560 emit light of a greater intensity than the LB light 110, the first MRB light 550, and the second MRB light 560, by having the third MRB light 570 emit light of a smaller angle from horizontal than the LB light 110, the first MRB light 550, and the second MRB light 560, by having the third MRB light 570 shine symmetrical light, or some combination of settings.

The third MRB pattern is designed such that it works in conjunction with the LB pattern to provide third MRB illumination in front of the local vehicle. Thus, in normal operation in a moving vehicle, the third MRB light 120 should never be activated at a time when the LB light 110 is not also activated.

In the embodiment of FIG. 5, the third MRB light 570 includes an array of a plurality of individual third MRB lights 571 that each shine light having a third middle-beam pattern into one of a plurality of corresponding third MRB zones in front of the local vehicle. These third MRB zones cover a field of view in front of the vehicle and may be overlapping or non-overlapping. They may be of equal size or of a different size.

For example, the embodiment of FIG. 5 shows a third MRB light 570 having five individual third MRB lights 571 that shine in five separate third MRB zones, respectively, in front of the local vehicle. In the disclosed embodiment the individual third MRB lights 571 are made up of LEDs, though this is by way of example only. Alternate embodiments can use any suitable lighting element for the individual third MRB lights 571. Furthermore, the third MLB light 570 could include more or fewer individual third MRB lights 571 with the number of third MRB zones adjusted accordingly. It could even contain only a single individual third MRB light 571 that covered the entire field of view in front of the local vehicle.

The high-beam (HB) light 130 is a light or a matrix of lights configured to emit light in a high-beam pattern that provides greater illumination in front of the local vehicle compared to the low-beam pattern, the first middle-beam pattern, the second middle-beam pattern, and the third middle-beam pattern and to satisfying legal requirements for a high beam, such as are set forth in the Society for Automotive Engineers (SAE) regulation J1983. This could be achieved by having the HB light 130 emit light of a greater intensity than all of the LB light 110, the first MRB light 550, the second MRB light 560, and the third MRB light 570, by having the HB light 130 emit light of a smaller angle from horizontal than all of the LB light 110 the first MRB light 550, the second MRB light 560, and the third MRB light 570, by having the HB light 130 shine symmetrical light, or some combination of settings.

The HB pattern is designed such that it works in conjunction with the LB pattern to provide HB illumination in front of the local vehicle. Thus, in normal operation in a moving vehicle, the HB light 130 should never be activated at a time when the LB light 110 is not also activated.

In the embodiment of FIG. 1, the HB light 130 includes an array of a plurality of individual HB lights 131 that each shine light having a high-beam pattern into one of a plurality of corresponding HB zones in front of the vehicle. These HB zones cover a field of view in front of the vehicle and may be overlapping or non-overlapping. They may be of equal size or of a different size. They may be the same as the MRB zones used for the individual MRB lights 121 or may be different zones, though control will be simpler if the MRB light 120 and the HB light 130 use the same zones.

For example, the embodiment of FIG. 1 shows a HB light 130 having five individual HB lights 131 that shine in five separate HB zones, respectively, in front of the local vehicle. In this embodiment, the number of individual HB lights 131 and the number of HB zones is the same as the number of first, second, and third MRB lights 551, 561, 571 and first, second, and third MRB zones, though this is by way of example only.

In the disclosed embodiment the individual HB lights 131 are made up of LEDs, though this is by way of example only. Alternate embodiments can use any suitable lighting element for the individual HB lights 131. Furthermore, the HB light 120 could include more or fewer individual HB lights 131 with the number of zones adjusted accordingly. It could even contain only a single individual HB light 131 that covered the entire field of view in front of the local vehicle.

By having an LB light 110, a first MRB light 550, a second MRB light 560, a third MRB light 570, and an HB light 130, the headlamp 100 can provide for a stepwise shift between light in a LB pattern from the LB light 110 and light in an HB pattern from the LB light 110 and the HB light 130. In particular, the headlamp 100 can step down from light in the HB pattern to light in the third MRB pattern from the LB light 110 and the third MRB light 550, then from light in the third MRB pattern to light in the second MRB pattern from the LB light 110 and the second MRB light 560, then from light in the second MRB pattern to light in the first MRB pattern from the LB light 110 and the first MRB light 570. In this way the headlamp can reduce the glare caused by the light it generates, but not drop immediately and dramatically down from the HB pattern to the LB pattern.

The headlamp 100 can then maintain its light in each of the first through third MRB patterns for a time before stepping down to the next lower intensity lighting pattern. In this way, the shift from light in the HB pattern to light in the LB pattern will not be dramatic and will be less distracting to the operator of the local vehicle.

Furthermore, this will allow for greater illumination in front of the local vehicle by allowing the headlamp 100 to project light in the third MRB pattern when light in the HB pattern would be too dazzling to the driver of a remote vehicle, but light in the third MRB pattern would not be too dazzling, to project light in the second MRB pattern when light in the third MRB pattern would be too dazzling to the driver of a remote vehicle, but light in the second MRB pattern would not be too dazzling, and to project light in the first MRB pattern when light in the second MRB pattern would be too dazzling to the driver of a remote vehicle, but light in the first MRB pattern would not be too dazzling.

Figure 6:
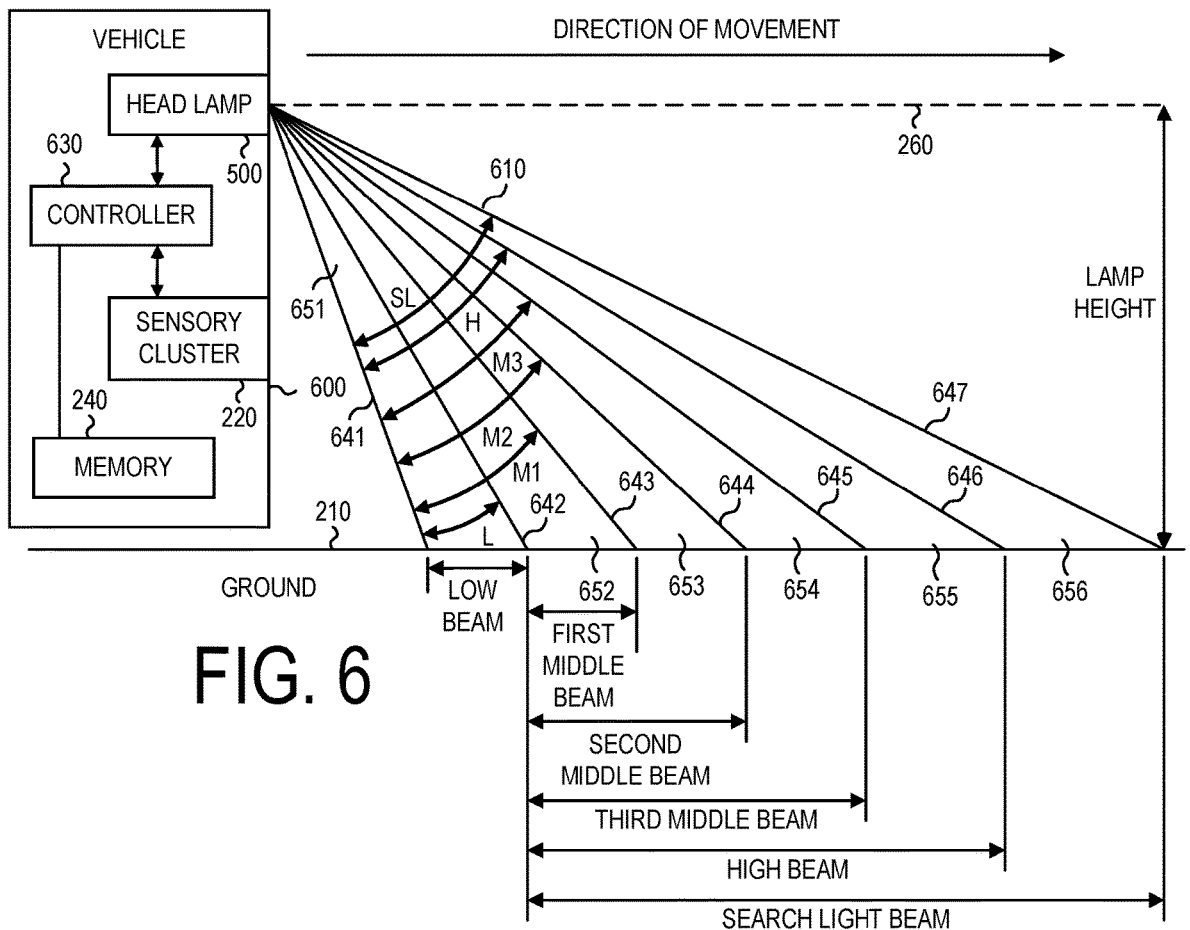
FIG. 6 is a diagram of a side view of the projection of light from the headlamp of FIG. 5 in front of a vehicle according to disclosed embodiments.

FIG. 6 is a diagram of a side view of the projection of light from the headlamp 500 of FIG. 5 in front of a vehicle according to disclosed embodiments.

As shown in FIG. 6, a local vehicle 600 is provided for travelling over a portion of ground 210. The local vehicle 600 includes a headlamp 500, a sensory cluster 220, a controller 630, and a memory 240. The headlamp 500 shines a light beam 610 over an area below a horizontal line 260 extending from the headlamp 100.

The sensory cluster 220 and the memory 240 operate as described above with respect to FIG. 2.

The local vehicle 600 in this embodiment could be a car, a truck, motorcycle, or any desired wheeled vehicle. Alternate embodiments could potentially be employed in air or water vehicles.

The headlamp 500 corresponds to the headlamp 500 from FIG. 5 and operates as described above with respect to FIG. 5. The headlamp 500 receives commands from and may provide information to the controller 630.

The controller 630 is configured to control the operation of the headlamp 500 and the sensory cluster 220. The controller 630 is also configured to store and read data from the memory 240. The controller 630 will receive sensory data from the sensory cluster 220 and may receive information from the headlamp 500. The controller 630 will provide instructions to the headlamp 500 and the sensory cluster 220 regarding how these two circuits should be operated.

The controller 630 acts upon the sensory data received from the sensory cluster 220. When this sensory data indicates that an oncoming or a passing remote vehicle is detected, then the controller 630 provides the control action necessary to adjust the operation of the headlamp 500 base based on at least one of the presence of a remote vehicle proximate to the local vehicle, a distance of the remote vehicle to the local vehicle, a relative speed between the remote vehicle and the local vehicle, or any other sensory data provided by the sensory cluster 220. This control action depends on whether the operating principle of the headlamp 500 is a matrix-type light or a dynamic-type light. Regardless, the controller 630 can operate to control the headlamp 500 such that the light it produces will not dazzle the operator of the detected remote vehicle and will comply with all pertinent regulations.

In various embodiments, the controller 630 can be a microcomputer, a microprocessor, a microcontroller, a CPU, an ASIC, etc. It may also have an integrated memory in addition to or in place of the memory 240.

The light beam 610 represents a combination of search light, HB light, first MRB light, second MRB light, third MRB light, and LB light, as defined by a first light boundary 641, a second light boundary 642, a third light boundary 643, a fourth light boundary 644, a fifth light boundary 645, a sixth light boundary 646, and a seventh light boundary 647. The intensity of the light in the light beam 610 may vary depending upon which beam patterns are currently active. For example, the light beam 610 may have a higher intensity when the HB light and the LB light are on as compared to when only the LB light is on.

The light beam 610 in this embodiment includes a first beam 651, a second beam 652, a third beam 653, a fourth beam 654, a fifth beam 655, and a sixth beam 656. The first beam 651 is defined by the first light boundary 641 and the second light boundary 642; the second beam 652 is defined by the second light boundary 642 and the third light boundary 643; the third beam 653 is defined by the third light boundary 643 and the fourth light boundary 644; the fourth beam 654 is defined by the fourth light boundary 644 and the fifth light boundary 645; the fifth beam 655 is defined by the fifth light boundary 645 and the sixth light boundary 646; and the sixth beam 656 is defined by the sixth light boundary 646 and the seventh light boundary 647.

A low beam of light output from the headlamp 500 is formed by the first beam 651. A first middle beam of light output from the headlamp 500 is formed by a combination of the first beam 651 and the second beam 652. A second middle beam of light output from the headlamp 500 is formed by a combination of the first beam 651, the second beam 652, and the third beam 653. A third middle beam of light output from the headlamp 500 is formed by a combination of the first beam 651, the second beam 652, the third beam 653, and a fourth beam 654. A high beam of light output from the headlamp 500 is formed by a combination of the first beam 651, the second beam 652, the third beam 653, the fourth beam 654, and the fifth beam 655. A search light beam output from the headlamp 500 is formed by a combination of the first beam 651, the second beam 652, the third beam 653, the fourth beam 654, the fifth beam 655, and the sixth beam 656.

With reference to the headlamp 500 of FIG. 5, the LB light 110 outputs the first beam 651; the first MRB light 550 outputs the second beam 652; the second MRB light 560 outputs the second beam 652 and the third beam 653; the third MRB light 570 outputs the second beam 652, the third beam 653, and the fourth beam 654; the HB light 130 outputs the second beam 652, the third beam 653, the fourth beam 654, and the fifth beam 655; and the search light 140 outputs the second beam 652, the third beam 653, the fourth beam 654, the fifth beam 655, and the sixth beam 656. In this way when the LB light 110 is on and the first MRB light 550, the second MRB light 550, the third MRB light 550, the HB light 130, and the search light 140 are all off, the headlamp 100 outputs the low beam. When the LB light 110 and the first MRB light 550 are on and the second MRB light 560, the third MRB light 570, the HB light 130, and the search light 140 are all off, the headlamp 100 outputs the first middle beam. When the LB light 110 and the second MRB light 560 are on and the first MRB light 550, the third MRB light 570, the HB light 130, and the search light 140 are all off, the headlamp 500 outputs the second middle beam. When the LB light 110 and the third MRB light 570 are on and the first MRB light 550, the second MRB light 560, the HB light 130, and the search light 140 are all off, the headlamp 500 outputs the third middle beam. When the LB light 110 and the HB light 130 are both on and the first MRB light 550, the second MRB light 560, the third MRB light 570, and the search light 140 are all off, the headlamp 500 outputs the high beam. Finally, when the LB light 110 and the search light 140 are both on and the first MRB light 550, the second MRB light 560, the third MRB light 570, and the HB light 130 are all off, the headlamp 500 outputs the search light beam.

Although the disclosed embodiment shows that the second MRB light 560 outputs both the second beam 652 and the third beam 653, alternate embodiments could have the second MRB light 560 only output the third beam 653. In such an embodiment, the headlamp 500 would output the second middle beam when the LB light 110, the first MRB light 550, and the second MRB light 560 were all on and the third MRB light 570, the HB light 130, and the search light 140 were all off. Similarly, although the disclosed embodiment shows that the third MRB light 570 outputs all of the second beam 652, the third beam 653, and the fourth beam 654, alternate embodiments could have the MRB light 570 only output the fourth beam 654. In such an embodiment, the headlamp 500 would output the third middle beam when the LB light 110, the first MRB light 550, the second MRB light 560, and the third MRB light 570 were all on and both the HB light 130 and the search light 140 were off. Likewise, although the disclosed embodiment shows that the HB light 130 outputs all of the second beam 652, the third beam 653, the fourth beam 654, and the fifth beam 655, alternate embodiments could have the HB light 130 only output the fifth beam 655. In such an embodiment, the headlamp 500 would output the high beam when the LB light 110, the first MRB light 550, the second MRB light 560, the third MRB light 570, and the HB light 130 were all on and the search light 140 was off. Finally, although the disclosed embodiment shows that the search light 140 outputs the second beam 652, the third beam 653, the fourth beam 654, the fifth beam 655, and the sixth beam 656, alternate embodiments could have the search light 140 only output the sixth beam 656. In such an embodiment, the headlamp 500 would output the search light beam when the LB light 110, the first MRB light 550, the second MRB light 560, the third MRB light 570, the HB light 130, and the search light 140 were all on. Other permutations of lights are possible.

As shown in FIG. 6, the first light boundary 641 is at a first declination from the horizontal line 260 that is greater than the second, third, fourth, fifth, sixth, and seventh light boundaries 641, 642, 643, 644, 645, 646, 647; the second light boundary 642 is at a second declination from the horizontal line 260 that is smaller than the first declination of the first light boundary 641; the third light boundary 643 is at a third declination from the horizontal line 260 that is smaller than the second declination of the second light boundary 642; the fourth light boundary 644 is at fourth declination from the horizontal line 260 that is smaller than the third declination of the third light boundary 643; the fifth light boundary 645 is at a fifth declination from the horizontal line 260 that is smaller than the fourth declination of the fourth light boundary 644; the sixth light boundary 646 is at a sixth declination from the horizontal line 260 that is smaller than the fifth declination of the fifth light boundary 645; and the seventh light boundary 647 is at a seventh declination from the horizontal line 260 that is smaller than the sixth declination of the sixth light boundary 664.

In addition to differing declinations, the first beam 651, the second beam 652, the third beam 653, the fourth beam 654, the fifth beam 655, and the sixth beam 656 can have different light intensities and even different shapes. For example, the first beam 651 could have an intensity that is lower than the second beam 652; the second beam 652 could have an intensity that is lower than the third beam 653; the third beam 653 could have an intensity that is lower than the fourth beam 654; the fourth beam 654 could have an intensity that is lower than the fifth beam 655; and the fifth beam 655 could have an intensity that is lower than the sixth beam 656. In this way the search light beam could have the greatest intensity, the high beam could have the second greatest intensity, the third middle beam could have the third greatest intensity, the second middle beam could have the fourth greatest intensity, the first middle beam could have the fifth greatest intensity, and the low beam could have the lowest intensity.

Likewise, the first beam 651 could have an asymmetrical shape to meet SAE requirements for a low beam, while the second, third, fourth, and fifth beams 652, 653, 654, 655, could have a symmetrical shape that covered the entire field of view in front of the local vehicle, and the sixth beam 656 could have a symmetrical shape that covered an area greater than the entire field of view in front of the local vehicle (i.e., greater than a normal field of view of an operator of the local vehicle). Other permutations are possible in alternate embodiments.

The specific angular limits for the first, second, third, fourth, fifth, sixth, and seventh light boundaries 641, 642, 643, 644, 645, 646, 647 can depend on the height of the local vehicle and the lamp height of the headlamp 500. A taller vehicle could require steeper declinations for the light boundaries 641, 642, 643, 644, 645, 646, 647 to maintain the lease required light limits for the local vehicle.

Dual Headlamp Design

Figure 7:
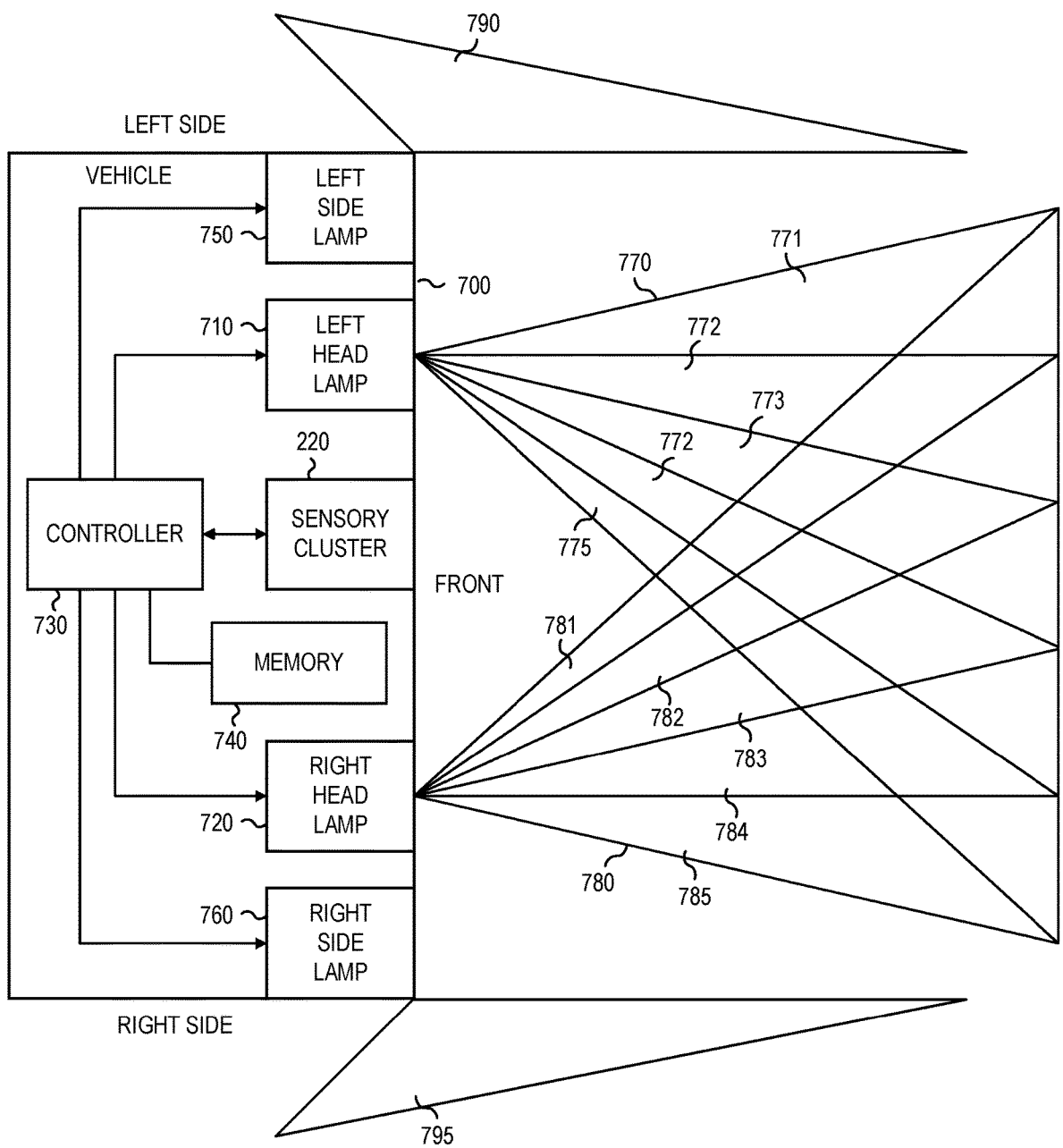
FIG. 7 is a diagram of a top view of the projection of light from a vehicle having two headlamps of FIG. 1 according to disclosed embodiments.

FIG. 7 is a diagram of a top view of the projection of light from a vehicle having two headlamps of FIG. 1 according to disclosed embodiments.

As shown in FIG. 7, a local vehicle 700 is provided. The local vehicle 700 includes a left headlamp 710, a right headlamp 720, a sensory cluster 220, a controller 730, a memory 740, a left side lamp 750, and a right side lamp 760.

The left headlamp 710 is located on a left side of the local vehicle 700 and shines light into a left front field of view 770 in front of the local vehicle 700. Similarly, the right headlamp 720 is located on a right side of the local vehicle 700 and shines light into a right front field of view 780 in front of the local vehicle 700.

The left side lamp 750 shines light into a left side field of view 790 on the left side of the local vehicle 700. The right side lamp 760 shines light into a right side field of view 795 on the right side of the local vehicle 700.

The local vehicle 700 in this embodiment could be a car, a truck, motorcycle, or any desired wheeled vehicle. Alternate embodiments could potentially be employed in air or water vehicles.

The left headlamp 710 and the right headlamp 720 are configured like the headlamp 100 in FIG. 1. The sensory cluster 220 operates as described above with respect to FIG. 2.

The left side lamp 750 contains a left side light that can be a matrix light or a dynamic light in various embodiments. Similarly, the right side lamp 760 contains a right side light that can be a matrix light or a dynamic light in various embodiments.

The controller 730 acts upon the sensory data received from the sensory cluster 220. When this sensory data indicates that an oncoming or a passing remote vehicle is detected, then the controller 730 provides the control action necessary to adjust the operation of the left and right headlamps 710, 720 base on at least one of the presence of a remote vehicle proximate to the local vehicle, a distance of the remote vehicle to the local vehicle, a relative speed between the remote vehicle and the local vehicle, or any other sensory data provided by the sensory cluster 220. This control action depends on whether the operating principle of the left and right headlamps 710, 720 is a matrix-type light or a dynamic-type light. Regardless, the controller 730 can operate to control the left and right headlamps 710, 720 such that the light they produce will not dazzle the operator of the detected remote vehicle and will comply with all pertinent regulations.

In various embodiments, the controller 730 can be a microcomputer, a microprocessor, a microcontroller, a CPU, an ASIC, etc. It may also have an integrated memory in addition to or in place of the memory 740.

The memory 740. Includes one or both of a static or dynamic memory and is configured to store data and programming used by the controller 230. In various embodiments, the memory can be SRAM, DRAM, PROM, EPROM, EEPROM, flash memory, or any suitable memory element. The memory 740 is not required in every embodiment.

The left front field of view 770 represents a first area in front of the local vehicle 700 that the operator can see, and which is illuminated by the left headlamp 710. The right front field of view 780 represents a second area in front of the local vehicle that the operator can see, and which is illuminated by the right headlamp 720. The left front field of view 770 and the right front field of view 780 have significant overlap. However, since they originate at different points, they are not entirely contiguous.

In the embodiment of FIG. 7, the left front field of view 770 is broken up into five separate left zones: a first left zone 771, a second left zone 772, a third left zone 773, a fourth left zone 774, and a fifth left zone 775. Similarly, the right front field of view 780 is broken up into five separate right zones: a first right zone 781, a second right zone 782, a third right zone 783, a fourth right zone 784, and a fifth right zone 785. However, this is by way of example only. Alternate embodiments could use more or fewer left and right zones. Some embodiments could have single zones that cover the entire fields of view 770, 780. Furthermore, although the embodiment of FIG. 7 discloses an equal number of left and right zones, alternate embodiments could vary the number of zones used by the left and right fields of view 770, 780.

Because the length and width of the left and right front fields of view 770, 780 are typically large with respect to the distance between the left and right headlamps 710, 720, the first through fifth left zones 771, 772, 773, 774, 775 will generally overlap significantly with the first through fifth right zones 781, 782, 783, 784, 785. However, this overlap will not be complete and as a remote vehicle gets closer to the local vehicle, it will be possible for the remote vehicle to be in non-corresponding left and right zones. For example, the remote vehicle could be located in a third left zone 773 and a fourth right zone 784.

The left zones 771, 772, 773, 774, 775 cover the left front field of view 770 in front of the vehicle and may be overlapping or non-overlapping. They may be of equal size or of a different size. Some embodiments can use the same left zones 771, 772, 773, 774, 775 for both the MRB lamp 120 and the HB lamp 130 in the left headlamp 710. Alternate embodiments can use different zones for the MRB lamp 120 and the HB lamp 130 in the left headlamp 710. The left zones 771, 772, 773, 774, 775 represent different segments of the left front field of view 770 in which the light emitted by the left headlamp 710 can be separately controlled.

Likewise, the right zones 781, 782, 783, 784, 785 cover the right front field of view 780 in front of the vehicle and may be overlapping or non-overlapping. They may be of equal size or of a different size. Some embodiments can use the same right zones 781, 782, 783, 784, 785 for both the MRB lamp 120 and the HB lamp 130 in the right headlamp 720. Alternate embodiments can use different zones for the MRB lamp 120 and the HB lamp 130 in the right headlamp 720. The right zones 781, 782, 783, 784, 785 represent different segments of the right front field of view 780 in which the light emitted by the right headlamp 720 can be separately controlled.

The controller 730 is configured to use the sensory data received from the sensory cluster 220 to determine whether a remote vehicle has been detected and in which of the left zones 771, 772, 773, 774, 775 and in which of the right zones 781, 782, 783, 784, 785 the remote vehicle is located.

In the embodiment of FIG. 7, a LB light 110 in the left headlamp 710 is configured to shine light in an LB pattern in the entire left front field of view 770. This is because in this embodiment the LB light 110 is always on when the left headlamp 710 is activated, regardless of whether a remote vehicle is detected. Similarly, an LB light 110 in the right headlamp 720 is configured to shine light in an LB pattern in the entire right front field of view 780. This is because in this embodiment the LB light 110 is always on when the rate headlamp 720 is activated, regardless of whether a remote vehicle is detected. Therefore, there is no need to provide any greater granularity for the LB lights 110 in the left and right headlamps 710, 720.

An MRB light 120 in the left headlamp 710 is configured to selectively shine light having an MRB pattern into one or more of the first through fifth left zones 771, 772, 773, 774, 775 based on control signals received from the controller 730. For example, individual MRB lights 121 in an MRB light 120 in the left headlamp 710 could shine light having the MRB pattern into just one of the left zones 771, 772, 773, 774, 775, three individual MRB lights 121 in the MRB light 120 could shine light having the MRB pattern into three of the left zones 771, 772, 773, 774, 775, a subset of the MRB light 120 could shine light having the MRB pattern or into any desired combination of left zones. In this way, the controller 730 can selectively turn on a middle beam in each of the five left zones 771, 772, 773, 774, 775. Thus, if a remote vehicle were detected in the third left zone 773, the controller 730 could shine a low beam in the third left zone 773 and a middle beam in the first, second, fourth, and fifth left zones 771, 772, 774, 775, thus maximizing the amount of light in the left field of view 770 while preventing the operator of the remote vehicle from being dazzled by light from the left headlamp 710. Similar control can be performed for an MRB light 120 in the right headlamp 720.

Similarly, the HB light 130 in the left headlamp 710 is configured to selectively shine light having an HB pattern into one or more of the first through fifth left zones 771, 772, 773, 774, 775 based on control signals received from the controller 730. For example, an individual HB light 131 in the HB light 130 could shine light having the MRB pattern into just one of the left zones 771, 772, 773, 774, 775, four individual HB lights 131 in the HB light 130 could shine light having the HB pattern into four of the left zones 771, 772, 773, 774, 775, or some subset of the HB light 130 could shine light having the HB pattern into any desired combination of zones. In this way, the controller 730 can selectively turn on a high beam in each of the five left zones 771, 772, 773, 774, 775. Thus, if a remote vehicle were detected in the second zone 772, the controller 730 could shine a low beam in the second left zone 772 and a high beam in the first, third, fourth, and fifth left zones 771, 773, 774, 775, thus maximizing the amount of light in the left front field of view 770 while preventing the operator of the remote vehicle from being dazzled by light from the left headlamp 710. Similar control can be performed for an HB light 130 in the right headlamp 720.

A search light 140 is each of the left and right headlamps 710, 720 configured to shine light having a search-light pattern in the entire left or right field of view 770, 780, respectively. This is because in this embodiment the search light 140 in each of the left and right headlamps 710, 720 is intended for use when the local vehicle 700 is not moving and there is no danger of dazzling the operator of a remote vehicle. Therefore, there is no need to provide any greater granularity.

In the in various embodiments, the left and right headlamps 710, 720 can be controlled in conjunction with each other or separately from each other. In other words, the left and right headlamps 710, 720 can be used to shine comparable light into corresponding left zones 771, 772, 773, 774, 775 and right zones 781, 782, 783, 784, 785. Alternatively, the light shone into various left zones 771, 772, 773, 774, 775 and right zones 781, 782, 783, 784, 785 can be controlled individually. This may be particularly relevant if the sensory cluster 220 detects a remote vehicle in non-corresponding left and right zones.

For example, the sensory cluster 220 might detect a remote vehicle in a second left zone 772 and a third right zone 783. In such situation, the controller 730 might control the left and right headlamps 710, 720 to shine light having a LB pattern in the second left zone 772 and the third right zone 783, but shine light having a HB pattern in the first, third, fourth, and fifth left zones 771, 773, 774, 775 and the first, second, fourth, and fifth right zones 781, 782, 784, 785.

Methods of Operation

Figure 8:
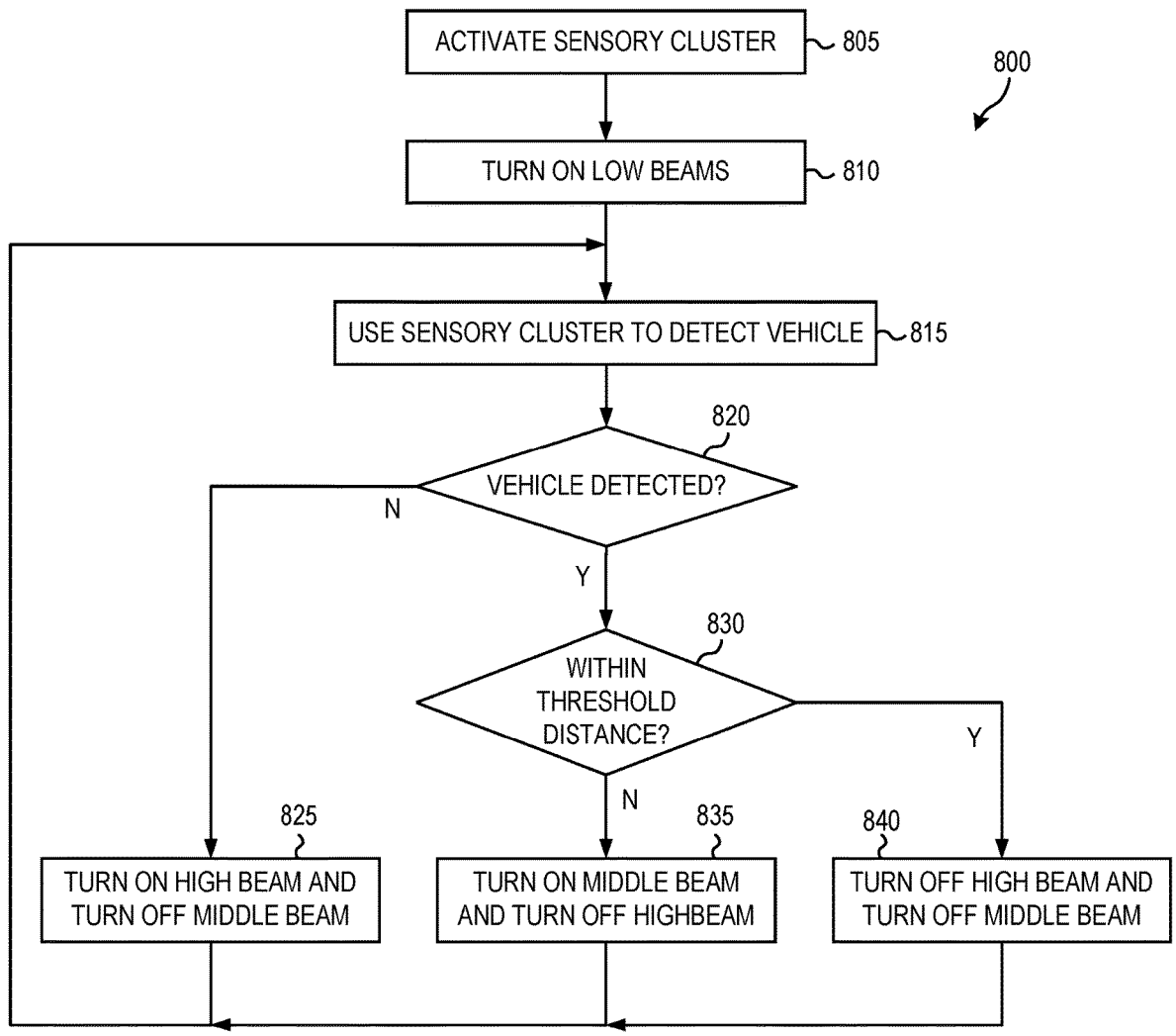
FIG. 8 is a flowchart describing the operation of a lighting system using a headlamp having low, high, and middle beams according to disclosed embodiments.

FIG. 8 is a flowchart describing the operation 800 of a lighting system using a headlamp having low, high, and middle beams according to disclosed embodiments.

As shown in FIG. 8, operation begins when a sensory cluster in a local vehicle is activated (805), and low beams are turned on (810). In other words, sensors in a sensory cluster begin gathering sensory data from the area around a local vehicle and one or more headlamps on the local vehicle are turned on and set to shine light having a low-beam (LB) pattern.

The lighting system then uses sensory data from the sensory cluster to detect whether a remote vehicle is present proximate to the local vehicle (815). This sensory data can include the presence of a remote vehicle proximate to the local vehicle, a distance of the remote vehicle from the local vehicle, a relative speed of the remote vehicle with respect to the local vehicle, or any other sensory data that a sensory cluster provides. For example, a controller within the local vehicle could analyze the sensory data gathered by the sensory cluster to determine whether a remote vehicle is proximate to the local vehicle.

The lighting system then decides, based on this determination, whether a remote vehicle has been detected (820).

If no remote vehicle has been detected, the lighting system turns on a high beam and turns off a middle beam (825). In other words the operation of one or more headlamps are controlled to shine light having a high-beam (HB) pattern. In many embodiments, this HB pattern may be designed to be used in conjunction with an existing LB pattern to project the high beam.

If a remote vehicle has been detected, the lighting system determines whether the remote vehicle is within a threshold distance (830). This can be used achieved by analyzing sensory data from the sensory cluster.

The threshold distance can be set to be a distance at which low beams should be used. The threshold distance could be a distance at which regulations require that light no greater than light in a LB pattern can be emitted from the local vehicle because of the danger of dazzling the operator of the remote vehicle. Alternatively, it could reflect a design choice for the vehicle manufacturer. Other criteria are possible in alternate embodiments.

However, the range between a detection distance at which the remote vehicle is first detected and the threshold distance can represent an area in which a high beam having an HB pattern would be inappropriate as being too likely to dazzle the operator of a remote vehicle, but light brighter than the low beam having the LB pattern could safely be used without risking dazzling the operator of the remote vehicle.

If the lighting system determines that the remote vehicle is not within the threshold distance, it turns on a middle beam and turns off a high beam (835). In other words, the lighting system controls a headlamp to emit light having an MRB pattern and stops the headlamp from emitting light having an HB pattern. This will cause the headlamp to emit light that is less intense or at a lower angle than the high beam light but that is more intense or at a higher angle than the low beam light. This offers an intermediate step between the high beam light and the low beam light.

If, however, the lighting system determines that the remote vehicle is within the threshold distance, it turns off both the high beam and the middle beam (840). In other words, the lighting system controls a headlamp to stop emitting light having either an MRB pattern or an HB pattern. This will cause the headlamp to only emit low beam light in an LB pattern.

Having set the light emitted by a headlamp (825, 835, 840), the lighting system returns to gathering sensory data from the sensory cluster and using that sensory data from the sensory cluster to detect whether a remote vehicle is proximate to the local vehicle (815).

The operations of FIG. 8 that involve turning off various beams can be performed in situations in which lights generating the relevant beams are currently on or currently off. If the relevant lights projecting the beams currently on, these operations can be performed by physically turning off a relevant light. If the lights projecting the relevant beams are currently off, these operations can be performed by observing that the light is already off and leaving the light in an off condition.

Although not specifically identified in FIG. 8, the sensory data from the sensory cluster can be further used to determine which of a plurality of zones proximate to the local vehicle the remote vehicle is detected, and whether the remote vehicle has moved from one zone to another. In such a case, the operations described in FIG. 8 can be performed on a per-zone basis. As a result, the middle and high beams can be controlled individually for each zone. Typically, the low beams will be constantly active in every zone whenever the lighting system is providing light in front of the local vehicle.

The method described in FIG. 8 allows the lighting system to provide an intermediate step between a low beam and a high beam. In other words, rather than having to switch immediately from a high beam to a low beam when a remote vehicle is detected proximate to the local vehicle, the lighting system can switch from a high beam to a middle beam when the remote vehicle is detected, and only switch from the middle beam to the low beam when the detected remote vehicle reaches a threshold distance lower than a detection distance. This intermediate step can both reduce the shock of switching from a high beam to a low beam and can provide a greater amount of light for a longer period of time as compared to a lighting system that only contains high and low beams.

In alternate embodiments the system can have more than one middle beam. In such embodiments, there will be multiple thresholds to determine which of the middle beams or high beams should be activated, if any. The largest distance threshold will indicate when the system should transition from the high beam to a highest-intensity middle beam, the smallest distance threshold will indicate when the system should transition from the lowest-intensity middle beam to the low beam, and any other distance thresholds will indicate when the system should transition between various middle beams. Typically the thresholds will be arranged so that the highest-intensity middle beam is activated at the largest detected distance, stepping down in middle beam intensities until the system reaches the lowest-intensity middle beam.

Figure 9:
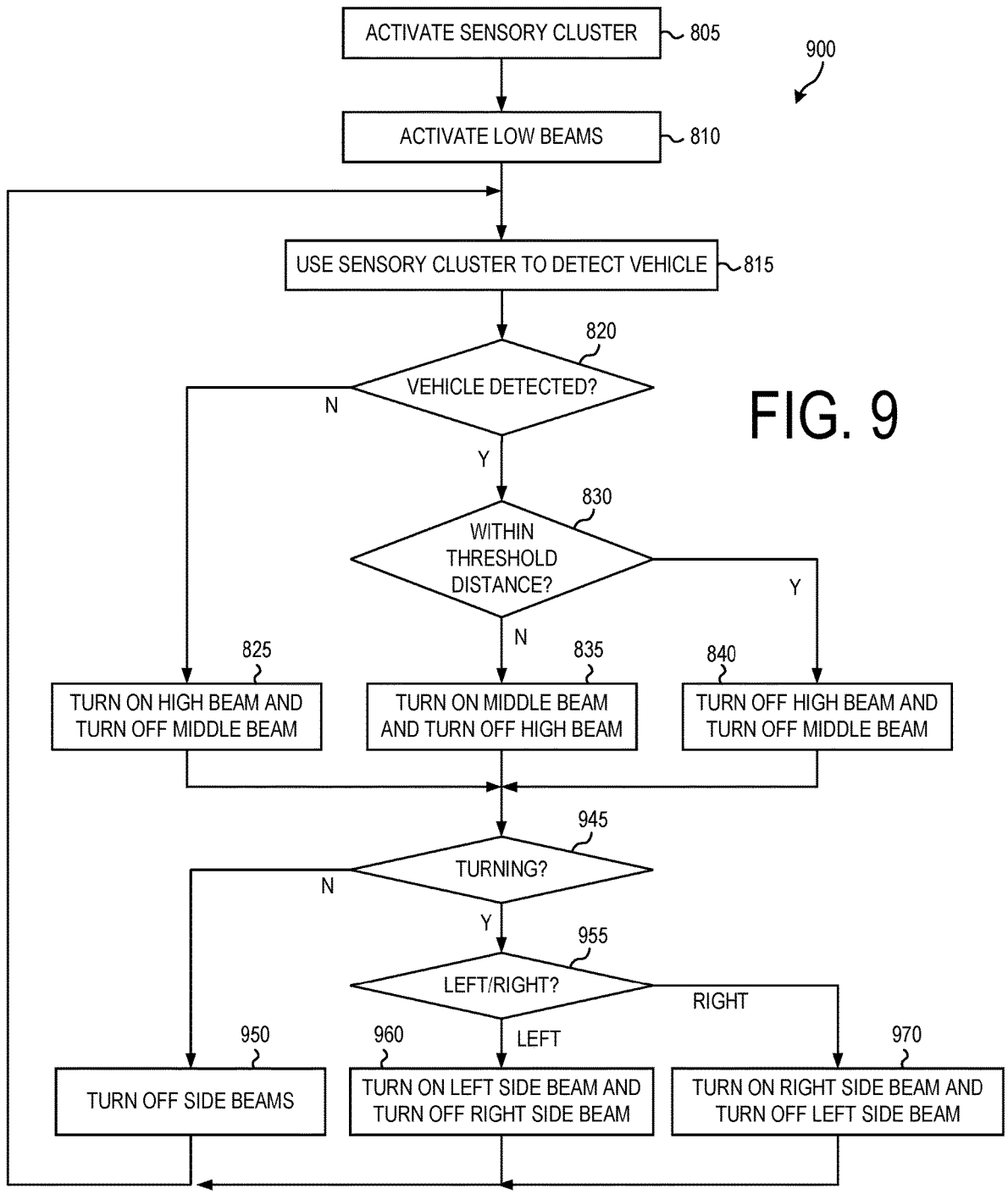
FIG. 9 is a flowchart describing the operation of a lighting system using a headlamp having low, high, and middle, and side beams according to disclosed embodiments.

FIG. 9 is a flowchart describing the operation of a lighting system using a headlamp having low, high, and middle, and side beams according to disclosed embodiments. The operation of FIG. 9 is similar to the operation of FIG. 8 except that it includes controlling side lamps that can illuminate an area to the left or right side of the local vehicle.

As shown in FIG. 9, a headlamp is controlled to generate a low beam possibly one of a middle beam or a high beam, depending upon the status of a detected remote vehicle (805, 810, 815, 820, 825 830, 835, 840). Operations 805, 810, 815, 820, 825 830, 835, 840 are performed as described above with respect to FIG. 8.

However, after setting the status of the high and middle beams (825, 835, 840), rather than returning to using the sensory cluster to detect a remote vehicle (815), the lighting system instead considers whether the local vehicle is turning (945). This determination can be used based on information gathered from a sensor or a controller inside the local vehicle that determines whether the local vehicle is turning, and whether it is turning left or right.

If the local vehicle is not turning, the lighting system turns off both a left and a right side beam and returns to using the sensory cluster to detect a remote vehicle (815). If the local vehicle is turning, the lighting system then determines whether the local vehicle is turning left or right (955). This determination can be used based on information gathered from a sensor or a controller inside the local vehicle that determines whether the local vehicle is turning, and whether it is turning left or right.

If the local vehicle is turning left, the lighting system turns on the left side beam and turns off the right side beam (960). This has the effect of providing additional lighting to the left of the local vehicle, in which direction it is currently turning. This greater illumination can increase safety by improving a lighted area to the left of the local vehicle that the operator of the local vehicle can see and providing greater identification of the local vehicle to people and other vehicles in the turning direction.

If, however, the local vehicle is turning right, the lighting system turns on the right side beam and turns off the left side beam (970). This has the effect of providing additional lighting to the right of the local vehicle, in which direction it is currently turning. This greater illumination can increase safety by improving a lighted area to the right of the local vehicle that the operator of the local vehicle can see and providing greater identification of the local vehicle to people and other vehicles in the turning direction.

After setting the status of the left and right side beams (960, 970) the lighting system returns to using the sensory cluster to detect a remote vehicle (815).

In this way, the lighting system provides a maximum amount of lighting for the operator of the local vehicle, while avoiding providing shining light unnecessarily that might distract pedestrians or other vehicle operators. Specifically, when the local vehicle is moving straight forward, there is less need to provide additional illumination to the left or right of the local vehicle, which additional light might be distracting to pedestrians or other vehicle operators.

However, when the local vehicle is actively turning, it would be desirable to provide extra lighting in the direction that the vehicle was turning to improve the illuminated field of view for the local vehicle operator, increasing the safety of operation of the local vehicle during that turn.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A lighting system for a local vehicle, comprising:
 a primary headlamp arranged on a front portion of the local vehicle and including
  a primary low-beam lamp configured to shine light in front of the local vehicle at a first angle below horizontal,
  a primary third middle-beam lamp, separate from the primary low-beam lamp, configured to selectively shine light in front of the local vehicle at a second angle below horizontal, and
  a primary high beam lamp, separate from the primary low-beam lamp and the primary third middle-beam lamp, configured to selectively shine light in front of the local vehicle at a third angle below horizontal;
 a sensory cluster configured to detect a remote vehicle in front of the primary headlamp; and
 a controller configured to control operation of the primary low-beam lamp, the primary third middle-beam lamp, and the primary high-beam lamp,
 wherein
 the first angle is greater than the second angle and the second angle is greater than the third angle,
 the controller is configured to control operation of the primary third middle-beam lamp, and the primary high-beam lamp based at least in part on signals from the sensory cluster,
 the primary headlamp further comprises a primary search lamp, separate from the primary low-beam lamp, the primary third middle-beam lamp, and the primary high-beam lamp, configured to selectively shine light in front of the local vehicle at a fourth angle below horizontal,
 the third angle is greater than the fourth angle, and
 the primary headlamp is further configured such that the primary search lamp cannot be activated when the local vehicle is moving.

2. The lighting system of claim 1, wherein the controller is one of a microcontroller, a microprocessor, or a microcomputer.

3. The lighting system of claim 1, wherein the sensory cluster includes one of a camera, a radar sensor, a lidar sensor, a sonar sensor, or a light detector.

4. The lighting system of claim 1, wherein
the sensory cluster is further configured to determine whether the remote vehicle is within a first distance from the local vehicle,
the sensory cluster is further configured to determine whether the remote vehicle is within a second distance from the local vehicle, and
the second distance is smaller than the first distance.

5. The lighting system of claim 1, further comprising
a first side lamp arranged on a first side portion of the vehicle and configured to selectively shine light from the first side of the local vehicle; and
a second side lamp arranged on a second side portion of the vehicle different from the first side portion and configured to selectively shine light from the second side of the local vehicle.

6. The lighting system of claim 1, further comprising
a secondary headlamp arranged on the front portion of the vehicle and including
a secondary low-beam lamp configured to selectively shine light in front of the vehicle at the first angle below horizontal,
a secondary third middle beam lamp, separate from the secondary low-beam lamp, to selectively shine light in front of the vehicle at the second angle below horizontal, and
a secondary high-beam lamp, separate from the first low-beam lamp and the secondary third middle-beam lamp, to selectively shine light in front of the vehicle at the third angle below horizontal,
wherein
the controller is further configured to control operation of the secondary low-beam lamp, the secondary third middle beam lamp, and the secondary high-beam lamp,
the controller is configured to control operation of the secondary third middle-beam lamp, and the secondary high-beam lamp based at least in part on the signals from the sensory cluster, and
the sensory cluster is further configured to detect the remote vehicle in front of the secondary headlamp.

7. The lighting system of claim 4, wherein
the primary headlamp further includes a primary first middle-beam lamp, separate from the primary low-beam lamp, the primary third middle-beam lamp, and the primary high-beam lamp, configured to selectively shine light in front of the local vehicle at a fifth angle below horizontal,
the sensory cluster is further configured to determine whether the remote vehicle is within a fourth distance from the local vehicle,
the controller is further configured to control operation of the primary first middle-beam lamp based at least in part on the signals from the sensory cluster,
the fifth angle is between the first angle and the second angle, and
the fourth distance is between the first distance and the second distance.

8. The lighting system of claim 1, wherein
the primary low-beam lamp is further configured to shine the light in a plurality of zones front of the local vehicle at the first angle below horizontal,
the primary third middle-beam lamp is further configured to selectively and separately shine the light in the plurality of zones in front of the local vehicle at the second angle below horizontal,
the primary high-beam lamp is further configured to selectively and separately shine the light in the plurality of zones in front of the local vehicle at the third angle below horizontal,
the controller is further configured to control operation of the primary third middle-beam lamp and the primary high-beam lamp separately for each of the plurality of zones, and
the sensory cluster is further configured to detect which zone or zones the remote vehicle is in when the remote vehicle is detected in front of the first headlamp.

9. A method of operating a lighting system for a local vehicle, comprising:
turning on a low-beam lamp to shine light in front of the vehicle at a first angle below horizontal;
determining that a remote vehicle is within a first distance from the local horizontal;
determining that the remote vehicle is not within a second distance from the local vehicle;
turning on a third middle-beam lamp to shine light in front of the local vehicle at a second angle below horizontal after determining that the remote vehicle is not within the second distance from the local vehicle;
turning off a high-beam lamp configured to selectively shine light in front of the vehicle at a third angle below horizontal after determining that the remote vehicle is not within the second distance from the local vehicle;
determining that the remote vehicle is no longer within the first distance from the local vehicle and that no other vehicle is within the first distance from the local vehicle after turning on the third middle-beam lamp and turning off the high-beam lamp;
turning on the high-beam lamp to shine light in front of the vehicle at the third angle below horizontal; and
turning off the third middle-beam lamp,
wherein
the first angle is greater than the second angle and the second angle is greater than the third angle,
the second distance is lower than the first distance, and
the low beam lamp, the third middle beam lamp, and the high-beam lamp are all separate lighting circuits.

10. The method of claim 9, further comprising:
determining that the remote vehicle is within the second distance from the local vehicle after turning on the third middle-beam lamp and turning off the high-beam lamp; and
turning off the high beam lamp and the third middle-beam lamp after determining that the remote vehicle is within the second distance from the local vehicle.

11. The method of claim 9, further comprising:
determining that the local vehicle is turning;
determining a direction that the local vehicle is turning;
turning on a first side-beam lamp corresponding to the direction that the local vehicle is turning; and
turning off a second side-beam lamp not corresponding to the direction that the local vehicle is turning.

12. The method of claim 9, further comprising:
determining that the remote vehicle is within the second distance from the local vehicle but is not within a fourth distance from the local vehicle after turning on the third middle-beam lamp and turning off the high-beam lamp;
turning on a first middle-beam lamp to shine light in front of the local vehicle at a fifth angle below horizontal after determining that the remote vehicle is within the second distance from the local vehicle but is not within the fourth distance from the local vehicle; and turning off the third middle-beam lamp after determining that the remote vehicle is within the second distance from the local vehicle but is not within the fourth distance from the local vehicle, wherein the fifth angle is between the first angle and the second angle, and the fourth distance is between the first distance and the second distance.

13. A method of operating a lighting system for a local vehicle, comprising:

turning on a low-beam lamp to shine light in a plurality of zones in front of the vehicle at a first angle below horizontal;

determining that a remote vehicle is within a first distance in front of the local vehicle;

determining that the remote vehicle is not within a second distance in front of the local vehicle;

determining a first detected zone or zones in front of the local vehicle in which the remote vehicle is located;

determining a second detected zone or zones in front of the local vehicle in which the remote vehicle is not located;

turning on a first portion of a third middle-beam lamp to shine light in the first detected zone or zones at a second angle below horizontal after determining that the remote vehicle is not within the second distance from the local vehicle;

turning off a second portion of the third middle-beam lamp configured to selectively shine light in the second detected zone or zones at the second angle below horizontal after determining that the remote vehicle is not within the second distance from the local vehicle;

turning off a first portion of a high-beam lamp configured to selectively shine light in the first detected zone or zones at a third angle below horizontal after determining that the remote vehicle is not within the second distance from the local vehicle; and turning on a second portion of a high-beam lamp to shine light in the second detected zone or zones at the third angle below horizontal after determining that the remote vehicle is not within the second distance from the local vehicle, wherein the first angle is greater than the second angle and the second angle is greater than the third angle, and the second distance is lower than the first distance.

14. The method of claim 13, further comprising:

determining that the remote vehicle is no longer within the first distance from the local vehicle and that no other vehicle is within the first distance from the local vehicle after turning on the third middle beam lamp and turning off the high-beam lamp;

turning on the first and second portions of the high-beam lamp to shine light in the plurality of zones in front of the vehicle at the third angle below horizontal, and turning off the first and second portions of the third middle-beam lamp.

15. The method of claim 13, further comprising:

determining that the remote vehicle is within the second distance from the local vehicle after turning on the first portion of the third middle-beam lamp and turning off the first portion of the high-beam lamp; and turning off the first portion of the third middle-beam lamp after determining that the remote vehicle is within the second distance from the local vehicle.

16. The method of claim 13, further comprising:

determining that the remote vehicle is within the second distance from the local vehicle but is not within a fourth distance from the local vehicle after turning on the first portion of the third middle-beam lamp and turning off the first portion of the high-beam lamp;

turning on a first portion of a first middle-beam lamp to shine light in the first detected zone or zones at a fifth angle below horizontal after determining that the remote vehicle is within the second distance from the local vehicle but is not within the fourth distance from the local vehicle;

turning off a second portion of the first middle-beam lamp configured to selectively shine light in the second detected zone or zones at the fifth angle below horizontal after determining that the remote vehicle is within the second distance from the local vehicle but is not within the fourth distance from the local vehicle; and turning off the first portion of the primary third middle-beam lamp after determining that the remote vehicle is within the second distance from the local vehicle but is not within the fourth distance from the local vehicle, wherein the fifth angle is between the first angle and the second angle, and the fourth distance is between the first distance and the second distance.

17. A system for operating a lighting system of a local vehicle, comprising:

a memory; and a processor cooperatively operable with the memory, and configured to, based on instructions stored in the memory, turn on a low-beam lamp to shine light in front of the vehicle at a first angle below horizontal, determine that a remote vehicle is within a first distance from the local vehicle, determine that the remote vehicle is not within a second distance from the local vehicle, turn on a third middle-beam lamp to shine light in front of the local vehicle at a second angle below horizontal after determining that the remote vehicle is not within the second distance from the local vehicle, turn off a high-beam lamp configured to selectively shine light in front of the vehicle at a third angle below horizontal after determining that the remote vehicle is not within the second distance from the local vehicle;

determine that the remote vehicle is no longer within the first distance from the local vehicle and that no other vehicle is within the first distance from the local vehicle after turning on the third middle-beam lamp and turning off the high-beam lamp;

turn on the high-beam lamp to shine light in front of the vehicle at the third angle below horizontal; and turn off the third middle-beam lamp, wherein the first angle is greater than the second angle and the second angle is greater than the third angle, the second distance is lower than the first distance, and the low-beam lamp, the third middle-beam lamp, and the high-beam lamp are all separate lighting circuits.

18. The method of claim 17, wherein
the processor determines that the remote vehicle is within the first distance from the local vehicle and determines that the remote vehicle is not within the second distance from the local vehicle at least in part using information received from a sensory cluster on the local vehicle.

19. The method of claim 17, wherein the processor is further configured to, based on instructions stored in the memory:
determine that the remote vehicle is within the second distance from the local vehicle after turning on the third middle-beam lamp and turning off the high-beam lamp; and
turn off the high beam lamp and the third middle-beam lamp after determining that the remote vehicle is within the second distance from the local vehicle.

20. The method of claim 17, wherein the processor is further configured to, based on instructions stored in the memory:
determine that the local vehicle is turning;
determine a direction that the local vehicle is turning;
turn on a first side-beam lamp corresponding to the direction that the local vehicle is turning; and
turn off a second side-beam lamp not corresponding to the direction that the local vehicle is turning.

21. The method of claim 17, wherein the processor is further configured to, based on instructions stored in the memory:
determine that the remote vehicle is within the second distance from the local vehicle but is not within a fourth distance from the local vehicle after turning on the third middle-beam lamp and turning off the high-beam lamp;
turn on a first middle-beam lamp to shine light in front of the local vehicle at a fifth angle below horizontal after determining that the remote vehicle is within the second distance from the local vehicle but is not within the fourth distance from the local vehicle; and
turn off the third middle-beam lamp after determining that the remote vehicle is within the second distance from the local vehicle but is not within the fourth distance from the local vehicle,
wherein
the fifth angle is between the first angle and the second angle, and
the fourth distance is between the first distance and the second distance.

* * * * *